United States Patent
Zhao et al.

(10) Patent No.: US 10,187,129 B2
(45) Date of Patent: Jan. 22, 2019

(54) INFORMATION FEEDBACK METHOD, TERMINAL, BASE STATION, COMMUNICATION SYSTEM AND STORAGE MEDIUM

(71) Applicant: ZTE Corporation, Shenzhen, Guangdong (CN)

(72) Inventors: Jing Zhao, Shenzhen (CN); Yijian Chen, Shenzhen (CN); Zhaohua Lu, Shenzhen (CN); Huahua Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 97 days.

(21) Appl. No.: 15/309,353

(22) PCT Filed: Aug. 1, 2014

(86) PCT No.: PCT/CN2014/083543
§ 371 (c)(1),
(2) Date: Nov. 7, 2016

(87) PCT Pub. No.: WO2015/168996
PCT Pub. Date: Nov. 12, 2015

(65) Prior Publication Data
US 2017/0085304 A1    Mar. 23, 2017

(30) Foreign Application Priority Data

May 7, 2014    (CN) .......................... 2014 1 0191058

(51) Int. Cl.
*H04B 7/04*    (2017.01)
*H04W 72/04*    (2009.01)
(Continued)

(52) U.S. Cl.
CPC .......... *H04B 7/0417* (2013.01); *H04B 7/0452* (2013.01); *H04B 7/0469* (2013.01);
(Continued)

(58) Field of Classification Search
CPC ...... H04B 7/04; H04B 7/0413; H04B 7/0417; H04B 7/0452; H04B 7/0456;
(Continued)

(56) References Cited

U.S. PATENT DOCUMENTS 9,319,118 B2 *    4/2016    Zhu ..................... H04B 7/0452
9,692,573 B2 *    6/2017    Hwang ................ H04L 5/0053
(Continued)

FOREIGN PATENT DOCUMENTS

CN    102122983 A    7/2011
CN    102237975 A    11/2011
(Continued)

OTHER PUBLICATIONS

Yi-Hsuan Lin et al: "Dual-Mode Low-Complexity Codebook Searching Algorithm and VLSI Architecture for LTE/LTE-Advanced Systems", Jul. 2013, IEEE Transactions on Signal Processing, IEEE Service Center, New York, NY, US, vol. 61, No. 14, pp. 3545-3562.
(Continued)

*Primary Examiner* — Jeffrey M Rutkowski
*Assistant Examiner* — Jonathan Wood
(74) *Attorney, Agent, or Firm* — Cooper Legal Group, LLC

(57) ABSTRACT

Disclosed are a channel state feedback information determination method, a terminal, a base station and a communication system. The method includes that: a channel state is measured to form a measurement result; when a Rank Indicator (RI) is 2, a precoding matrix is formed according to the measurement result and a precoding codebook matrix model W; and channel state feedback information is formed according to the precoding matrix. The disclosure further discloses a computer storage medium.

20 Claims, 3 Drawing Sheets

(51) Int. Cl.
| | |
|---|---|
| *H04B 7/0417* | (2017.01) |
| *H04L 1/00* | (2006.01) |
| *H04B 7/0456* | (2017.01) |
| *H04B 7/06* | (2006.01) |
| *H04B 7/0452* | (2017.01) |

(52) U.S. Cl.
CPC ......... *H04B 7/0473* (2013.01); *H04B 7/0482* (2013.01); *H04B 7/0486* (2013.01); *H04B 7/063* (2013.01); *H04B 7/0626* (2013.01); *H04B 7/0639* (2013.01); *H04L 1/00* (2013.01); *H04W 72/0413* (2013.01)

(58) Field of Classification Search
CPC .. H04B 7/0478; H04B 7/0482; H04B 7/0486; H04B 7/0619; H04B 7/0626; H04B 7/063; H04B 7/0632; H04B 7/0639; H04B 17/24; H04W 24/10; H04W 72/04; H04W 72/0413; H04W 72/06; H04L 1/0026; H04L 5/0048; H04L 5/0057
See application file for complete search history.

(56) References Cited

U.S. PATENT DOCUMENTS

| | | | | |
|---|---|---|---|---|
| 9,826,425 | B2* | 11/2017 | Kim | H04W 24/10 |
| 9,847,818 | B2* | 12/2017 | Yue | H04B 7/0478 |
| 9,848,351 | B2* | 12/2017 | Han | H04W 4/70 |
| 9,871,639 | B2* | 1/2018 | Lee | H04L 5/0057 |
| 9,906,279 | B2* | 2/2018 | Zhang | H04B 7/0417 |
| 2007/0086549 | A1* | 4/2007 | Kim | H04B 7/04 375/347 |
| 2008/0285667 | A1* | 11/2008 | Mondal | H04B 7/0417 375/260 |
| 2009/0296844 | A1 | 12/2009 | Ihm | |
| 2010/0008447 | A1* | 1/2010 | Mueck | H04L 1/0625 375/299 |
| 2011/0122968 | A1* | 5/2011 | Jongren | H04B 7/0639 375/296 |
| 2011/0206153 | A1 | 8/2011 | Zheng | |
| 2011/0268204 | A1* | 11/2011 | Choi, II | H04B 7/0639 375/260 |
| 2011/0274188 | A1 | 11/2011 | Sayana | |
| 2013/0058424 | A1* | 3/2013 | Enescu | H04B 7/0486 375/267 |
| 2013/0058425 | A1* | 3/2013 | Zhou | H04B 7/0469 375/267 |
| 2013/0076566 | A1* | 3/2013 | Jiang | H01Q 1/246 342/373 |
| 2013/0077514 | A1* | 3/2013 | Dinan | H04L 5/0057 370/252 |
| 2013/0083681 | A1* | 4/2013 | Ebrahimi Tazeh Mahalleh | H04L 5/0057 370/252 |
| 2013/0094392 | A1* | 4/2013 | Kim | H04L 1/0026 370/252 |
| 2013/0215988 | A1* | 8/2013 | Nagata | H04L 25/03343 375/267 |
| 2013/0258874 | A1* | 10/2013 | Khoshnevis | H04L 5/0057 370/252 |
| 2013/0279460 | A1* | 10/2013 | Kim | H04L 5/0057 370/329 |
| 2014/0078919 | A1* | 3/2014 | Hammarwall | H04L 5/0057 370/252 |
| 2014/0092787 | A1* | 4/2014 | Han | H04W 4/70 370/280 |
| 2014/0098689 | A1* | 4/2014 | Lee | H04B 7/0469 370/252 |
| 2014/0112406 | A1* | 4/2014 | Zhu | H04B 7/0452 375/267 |
| 2014/0146778 | A1 | 5/2014 | Wang et al. | |
| 2014/0192917 | A1* | 7/2014 | Nam | H04B 7/0417 375/267 |
| 2014/0241274 | A1* | 8/2014 | Lee | H04L 5/0048 370/329 |
| 2014/0286291 | A1* | 9/2014 | Einhaus | H04B 7/024 370/329 |
| 2014/0307824 | A1* | 10/2014 | Shen | H04L 5/0007 375/267 |
| 2014/0328422 | A1* | 11/2014 | Chen | H04B 7/0486 375/267 |
| 2014/0362940 | A1* | 12/2014 | Yue | H04B 7/0478 375/267 |
| 2014/0362941 | A1* | 12/2014 | Gomadam | H04B 7/0456 375/267 |
| 2015/0043673 | A1* | 2/2015 | Lee | H04B 7/0469 375/267 |
| 2015/0092768 | A1* | 4/2015 | Ng | H04W 48/16 370/350 |
| 2015/0117352 | A1* | 4/2015 | Nammi | H04L 12/00 370/329 |
| 2015/0180684 | A1* | 6/2015 | Chen | H04B 17/24 370/252 |
| 2015/0327287 | A1* | 11/2015 | Kim | H04W 72/121 370/329 |
| 2015/0358066 | A1* | 12/2015 | Liu | H04B 7/0417 375/267 |
| 2015/0358847 | A1* | 12/2015 | Takahashi | H04W 24/10 370/252 |
| 2015/0382205 | A1* | 12/2015 | Lee | H04B 7/0417 370/329 |
| 2016/0072567 | A1* | 3/2016 | Kim | H04B 7/0486 375/267 |
| 2016/0080058 | A1* | 3/2016 | Kang | H04B 7/0617 370/329 |
| 2016/0330011 | A1* | 11/2016 | Lee | H04L 5/0066 |
| 2016/0374067 | A1* | 12/2016 | Uchiyama | H04W 72/04 |
| 2017/0041880 | A1* | 2/2017 | Ouchi | H04W 16/32 |
| 2017/0055242 | A1* | 2/2017 | Kusashima | H04L 5/0051 |
| 2017/0135039 | A1* | 5/2017 | Takeda | H04W 52/0225 |
| 2017/0201306 | A1* | 7/2017 | Shimezawa | H04B 7/0626 |

FOREIGN PATENT DOCUMENTS

| | | |
|---|---|---|
| CN | 102625358 A | 8/2012 |
| CN | 102932112 A | 2/2013 |
| EP | 2804425 A1 | 11/2014 |
| JP | 2012531129 A | 12/2012 |
| JP | 2013529868 A | 7/2013 |
| JP | 2013543308 A | 11/2013 |
| WO | 2013015664 A2 | 1/2013 |
| WO | 2013105810 A1 | 7/2013 |
| WO | 2014023727 A9 | 2/2014 |

OTHER PUBLICATIONS

Supplementary European Search Report in international application number: 14891584.6, dated Mar. 31, 2017, 5 pgs.
International Search Report in international application number: PCT /CN2014/083543, dated Feb. 10, 2015, 5 pgs.
English Translation of the Written Opinion of the International Search Authority in international application number: PCT/CN2014/083543, dated Feb. 10, 2015, 10 pgs.
Third Generation Partnership Project; Technical Specification group Radio Access Network; (Release 10); Technical Specification, Mar. 2012, 125 pgs.

* cited by examiner

INFORMATION FEEDBACK METHOD, TERMINAL, BASE STATION, COMMUNICATION SYSTEM AND STORAGE MEDIUM

TECHNICAL FIELD

The disclosure relates to an information feedback technology in the technical field of communications, and in particular to a channel state feedback information feedback method, a terminal, a base station, a communication system and a storage medium.

BACKGROUND

Along with the development of communication technologies, a Massive Multi-input Multi-output (Massive MIMO) technology emerges, and it is a key enhancement technology in a next-generation communication technology. A Massive MIMO communication system has the following main characteristics: a massive antenna array is configured at a base station side, for example, 64 or 128 antennas and even more; and during data transmission, multiple users are simultaneously multiplexed at the same frequency by virtue of a Multi-User MIMO (MU-MIMO) technology. A ratio of the number of antennas to the number of multiplexed users is kept about 5 to 10.

In a conventional art, there are 8 antennas at most, and the 8 antennas are usually arranged in a column. Apparently, along with the development of the communication technologies, there will be more and more antennas. An existing method for channel transmission may cause channel mismatch and further cause low precoding performance.

SUMMARY

In view of this, the embodiments of the disclosure are intended to provide a method for feeding back channel state feedback information, a terminal, a base station, a communication system and a storage medium, so as to improve precoding performance.

To this end, the technical solutions of the embodiments of the disclosure are implemented as follows:

In a first aspect, the embodiments of the disclosure provide a method for determining channel state feedback information, including that:

a channel state is measured to form a measurement result;

when a Rank Indicator (RI) is 2, a precoding matrix is formed according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors; and channel state feedback information is formed according to the precoding matrix.

In an example embodiment, the step that the channel state feedback information is formed according to the precoding matrix may include that:

channel state feedback information including a codebook index is formed according to the precoding matrix and a mapping relationship between precoding matrices and codebook indices.

In an example embodiment, the codebook indices may include: a first index i1, a second index i2 and a third index i3.

In an example embodiment, the codebook indices may further include: a fourth index i4.

In an example embodiment, the codebook indices may further include: a fifth index i5.

In an example embodiment, vectors $v_0$ and $v_1$ may have a common candidate vector set A1; and i1 may be configured to at least indicate the set A1.

In an example embodiment, vectors $v_0$, $v_1$ and $v_3$ may have a common candidate vector set A2; and i1 may be configured to at least indicate the set A2.

In an example embodiment, vectors $v_2$ and $v_3$ may have a common candidate vector set A3; and i2 or i3 may be configured to at least indicate the candidate vector set A3.

In an example embodiment, i1 may be further configured to at least indicate at least part of information of at least one of $\alpha_1$, $\alpha_2$ and $\beta$.

In an example embodiment, i2 may be further configured to at least indicate specific vectors of $v_0$ and $v_1$ in the vector set A1 or A2.

In an example embodiment, i2 may be further configured to at least indicate specific vectors of $v_0$, $v_1$, $v_2$ and $v_3$ in the vector set A2.

In an example embodiment, i3 may be further configured to at least indicate specific vectors of $v_2$ and $v_3$ in the vector set A2.

In an example embodiment, vector $v_2 = R_{OT1} \times v_0$, and i3 may be further configured to at least indicate matrix $R_{OT1}$; or, vector $v_3 = R_{OT2} \times v_1$, and i3 may be further configured to at least indicate matrix $R_{OT2}$; or, vector $$\begin{bmatrix} v_2 \\ v_3 \end{bmatrix} = R_{OT3} \times \begin{bmatrix} v_0 \\ v_1 \end{bmatrix},$$

and i3 may be further configured to at least indicate matrix $R_{OT3}$, where both $R_{OT1}$ and $R_{OT2}$ are $$\frac{N_t}{4} \times \frac{N_t}{4}$$

dimensional matrices; and $R_{OT3}$ is a $$\frac{N_t}{2} \times \frac{N_t}{2}$$

dimensional matrix.

In an example embodiment, i4 may be configured to at least indicate specific vectors of $v_2$ and $v_3$ in the vector set A3.

In an example embodiment, i2 may be further configured to at least indicate a candidate vector set B1 of $v_0$ and $v_1$ in the candidate vector set A2; and i3 may be further configured to at least indicate a candidate vector set B2 of $v_2$ and $v_3$ in the candidate vector set A2.

In an example embodiment, i4 may be further configured to at least indicate specific vectors of $v_0$ and $v_1$ in the vector set B1; and i5 may be further configured to at least indicate specific vectors of $v_2$ and $v_3$ in the vector set B2.

In an example embodiment, i2 may be further configured to at least indicate the specific vector of $v_0$ in the vector set A2; i3 may be further configured to at least indicate the specific vector of $v_1$ in the vector set A2; i4 may be further configured to at least indicate the specific vector of $v_2$ in the vector set A2; and i5 may be further configured to at least indicate the specific vector of $v_3$ in the vector set A2.

In an example embodiment, i2 may be further configured to at least indicate at least part of information of at least one of $\alpha_1$, $\alpha_2$ and $\beta$.

In an example embodiment, i3 may be further configured to at least indicate at least part of information of at least one of $\alpha_1$, $\alpha_2$ and $\beta$.

In an example embodiment, vector $v_0=v_1$.

In an example embodiment, vector $v_2=v_3$.

In an example embodiment, vector $v_0=v_1=v_2=v_3$.

In an example embodiment, i1 may be a broadband feedback.

In an example embodiment, $\alpha_1$ or $\alpha 2$ may be obtained according to at least one of vectors $v_0$, $v_1$, $v_2$ and $v_3$.

In a second aspect, the embodiments of the disclosure provide a method for determining channel state feedback information, including:

channel state feedback information fed back by a terminal is received, when an RI is 2, the channel state feedback information is a precoding matrix formed according to a measurement result of channel measurement and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors.

In an example embodiment, the step that the channel state feedback information fed back by the terminal is received may be implemented as follows: channel state feedback information including a codebook index is received; and the method may further include that: the precoding matrix is determined according to the codebook index and a mapping relationship between precoding matrices and codebook indices.

In a third aspect, the disclosure provides a method for determining channel state feedback information, including that:

a terminal measures a channel state to form a measurement result;

when an RI is 2, the terminal forms a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors;

the terminal forms channel state feedback information according to the precoding matrix;

the terminal sends the channel state feedback information; and a base station receives the channel state feedback information fed back by the terminal.

In an example embodiment, the step that the terminal forms the channel state feedback information according to the precoding matrix may include that: the terminal forms channel state feedback information including a codebook index according to the precoding matrix and a mapping relationship between precoding matrices and codebook indices; the step that the base station receives the channel state feedback information fed back by the terminal may be implemented as follows: the channel state feedback information including the codebook index is received; and the base station may further determine the precoding matrix according to the codebook index and the mapping relationship between the precoding matrices and the codebook indices.

In a fourth aspect, the embodiments of the disclosure provide a terminal, including:

a measurement unit, configured to measure a channel state to form a measurement result;

a first determination unit, configured to, when an RI is 2, form a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors; and a forming unit, configured to form channel state feedback information according to the precoding matrix.

In an example embodiment, the forming unit may include:

a storage module, configured to store a mapping relationship between precoding matrices and codebook indices; and a forming module, configured to form channel state feedback information including a codebook index according to the precoding matrix and the mapping relationship between the precoding matrices and the codebook indices.

In an example embodiment, the codebook indices may include: a first index i1, a second index i2 and a third index i3.

In an example embodiment, the codebook indices may further include: a fourth index i4.

In an example embodiment, the codebook indices may further include: a fifth index i5.

In an example embodiment, vectors $v_0$ and $v_1$ may have a common candidate vector set A1; and i1 may be configured to at least indicate the set A1.

In an example embodiment, vectors $v_0$, $v_1$ and $v_3$ may have a common candidate vector set A2; and i1 may be configured to at least indicate the set A2.

In an example embodiment, vectors $v_2$ and $v_3$ may have a common candidate vector set A3; and i2 or i3 may be configured to at least indicate the candidate vector set A3.

In an example embodiment, i1 may be further configured to at least indicate at least part of information of at least one of $\alpha_1$, $\alpha_2$ and $\beta$.

In an example embodiment, i2 may be further configured to at least indicate specific vectors of $v_0$ and $v_1$ in the vector set A1 or A2.

In an example embodiment, i2 may be further configured to at least indicate specific vectors of $v_0$, $v_1$, $v_2$ and $v_3$ in the vector set A2.

In an example embodiment, i3 may be further configured to at least indicate specific vectors of $v_2$ and $v_3$ in the vector set A2.

In an example embodiment, vector $v_2 = R_{OT1} \times v_0$, and i3 may be further configured to at least indicate matrix $R_{OT1}$; or, vector $v_3 = R_{OT2} \times v_1$, and i3 may be further configured to at least indicate matrix $R_{OT2}$; or, vector $$\begin{bmatrix} v_2 \\ v_1 \end{bmatrix} = R_{OT3} \times \begin{bmatrix} v_0 \\ v_1 \end{bmatrix},$$

and i3 may be further configured to at least indicate matrix $R_{OT3}$, where both $R_{OT1}$ and $R_{OT2}$ are $$\frac{N_t}{4} \times \frac{N_t}{4}\text{-}$$

dimensional matrices; and $R_{OT3}$ is a $$\frac{N_t}{2} \times \frac{N_t}{2}\text{-}$$

dimensional matrix.

In an example embodiment, i4 may be configured to at least indicate specific vectors of $v_2$ and $v_3$ in the vector set A3.

In an example embodiment, i2 may be further configured to at least indicate a candidate vector set B1 of $v_0$ and $v_1$ in the candidate vector set A2; and i3 may be further configured to at least indicate a candidate vector set B2 of $v_2$ and $v_3$ in the candidate vector set A2.

In an example embodiment, i4 may be further configured to at least indicate specific vectors of $v_0$ and $v_1$ in the vector set B1; and i5 may be further configured to at least indicate specific vectors of $v_2$ and $v_3$ in the vector set B2.

In an example embodiment, i2 may be further configured to at least indicate the specific vector of $v_0$ in the vector set A2; i3 may be further configured to at least indicate the specific vector of $v_1$ in the vector set A2; i4 may be further configured to at least indicate the specific vector of $v_2$ in the vector set A2; and i5 may be further configured to at least indicate the specific vector of $v_3$ in the vector set A2.

In an example embodiment, i2 may be further configured to at least indicate at least part of information of at least one of $\alpha_1$, $\alpha_2$ and $\beta$.

In an example embodiment, i3 may be further configured to at least indicate at least part of information of at least one of $\alpha_1$, $\alpha_2$ and $\beta$.

In an example embodiment, vector $v_0 = v_1$.

In an example embodiment, vector $v_2 = v_3$.

In an example embodiment, vector $v_0 = v_1 = v_2 = v_3$.

In an example embodiment, i1 may be a broadband feedback.

In an example embodiment, $\alpha_1$ or $\alpha 2$ may be obtained according to at least one of vectors $v_0$, $v_1$, $v_2$ and $v_3$.

In a fifth aspect, the embodiments of the disclosure provide a base station, including:

a receiving unit, configured to receive channel state feedback information fed back by a terminal, when an RI is 2, the channel state feedback information is a precoding matrix formed according to a measurement result of channel measurement and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors.

In an example embodiment, the receiving unit may be configured to receive channel state feedback information including a codebook index; data amounts of the codebook index may be smaller than those of the precoding matrix; and the base station may further include: a second determination unit, configured to determine the precoding matrix according to the codebook index and a mapping relationship between precoding matrices and codebook indices.

In a sixth aspect, the embodiments of the disclosure provide a communication system, including:

a terminal, configured to measure a channel state to form a measurement result, when an RI is 2, form a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors, form channel state feedback information according to the precoding matrix, and send the channel state feedback information; and a base station, configured to receive the channel state feedback information fed back by the terminal.

In an example embodiment, the terminal may be configured to form channel state feedback information including a codebook index according to the precoding matrix and a mapping relationship between precoding matrices and codebook indices; data amounts of the codebook index may be smaller than those of the precoding matrix; and the base station may be configured to receive the channel state feedback information fed back by the terminal, namely receive the channel state feedback information including the codebook index, and determine the precoding matrix according to the codebook index and the mapping relationship between the precoding matrices and the codebook indices.

In a seventh aspect, the embodiments of the disclosure further provide a computer storage medium, having computer-executable instructions stored therein, the computer-executable instructions being configured for at least one of the methods in the first aspect to third aspect of the embodiments of the disclosure.

According to the method for feeding back channel state feedback information, the terminal, the base station and the communication system of the embodiments of the disclosure, the precoding matrix is determined according to the precoding codebook matrix model W, which is applicable to a communication system with at least 8 antennas in a base station; a plurality of antennas form channel selection and matching in an antenna matrix including multiple rows and multiple columns; and more parameters are adopted to form the precoding matrix which maps the total number of the communication ports or the antennas, so that a communication channel with higher communication quality may be allocated to the terminal, and the precoding performance may be improved.

DETAILED DESCRIPTION

Example embodiments of the disclosure will be described below with reference to the drawings in detail, and it should be understood that the example embodiments described below are only intended to describe and explain the disclosure and not intended to limit the disclosure.

A method for determining channel state feedback information according to the embodiments of the disclosure includes three solutions at a base station side, at a terminal side and based on interaction between the base station and the terminal, respectively.

Figure 1:
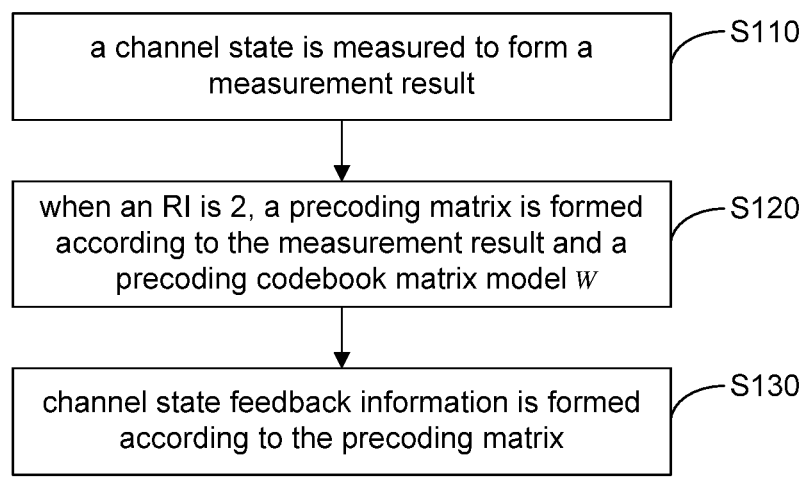
FIG. 1 is a first flowchart of a method for determining channel state feedback information according to an embodiment of the disclosure.

According to the solution at the terminal side, the method, as shown in FIG. 1, includes:

Step 110: a channel state is measured to form a measurement result;

Step 120: when an RI is 2, a precoding matrix is formed according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors; and Step 130: channel state feedback information is formed according to the precoding matrix.

Each vector of the precoding matrix may be specifically solved with reference to solution of related parameters in 3rd Generation Partnership Project (3GPP) TS 36.213 V10.5.0.

In Step 110, the operation that the channel state is measured includes that a downlink Channel State Information Reference Signal (CSI-RS) is received.

The precoding codebook matrix model w is information pre-stored by the terminal.

In an example embodiment, Step 130 includes that:

channel state feedback information including a codebook index is formed according to the precoding matrix and a mapping relationship between precoding matrices and codebook indices.

In a specific implementation process, data amount of the codebook index may be smaller than data amount of the precoding matrix; and the codebook indices includes: a first index i1, a second index i2 and a third index i3.

In addition, the codebook indices further includes: a fourth index i4 and/or a fifth index i5.

There are many solutions for making the first index i1, the second index i2, the third index i3, the fourth index i4 and/or the fifth index i5 respectively indicate each variable in W, which are shown in the subsequent examples. In specific embodiments, formation of the codebook indices, indicated contents and a mapping relationship among codebook indices are applicable to the channel state feedback information determination method at the terminal side, and are also applicable to channel state feedback information determination methods at the base station side and during interaction between two sides, i.e. the base station and the terminal. Related information such as the codebook indices may be pre-stored by the base station and the terminal before communication; and the codebook indices may also be included in a communication protocol, and both the base station and the terminal execute a method of the communication protocol including the codebook indices to know the mapping relationship between the codebook indices and the precoding matrices.

Adopting the codebook index of which the data amount are smaller than those of the precoding matrix to indicate the precoding matrix may reduce the amount of information fed back to the base station by the terminal.

A channel state feedback information method at a base station side includes that:

channel state feedback information fed back by a terminal is received, when an RI is 2, the channel state feedback information is a precoding matrix formed according to a measurement result of channel measurement and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors.

Figure 2:
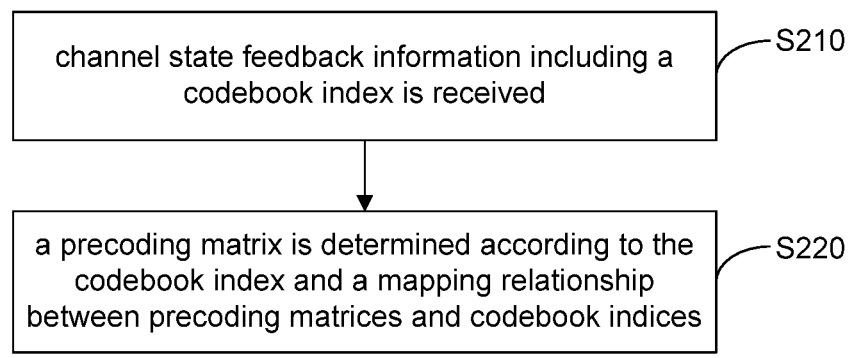
FIG. 2 is a second flowchart of a method for determining channel state feedback information according to an embodiment of the disclosure.

Furthermore, as shown in FIG. 2, the method at the base station side includes:

Step 210: channel state feedback information including a codebook index is received; and Step 220: the precoding matrix is determined according to the codebook index and a mapping relationship between precoding matrices and codebook indices.

Figure 3:
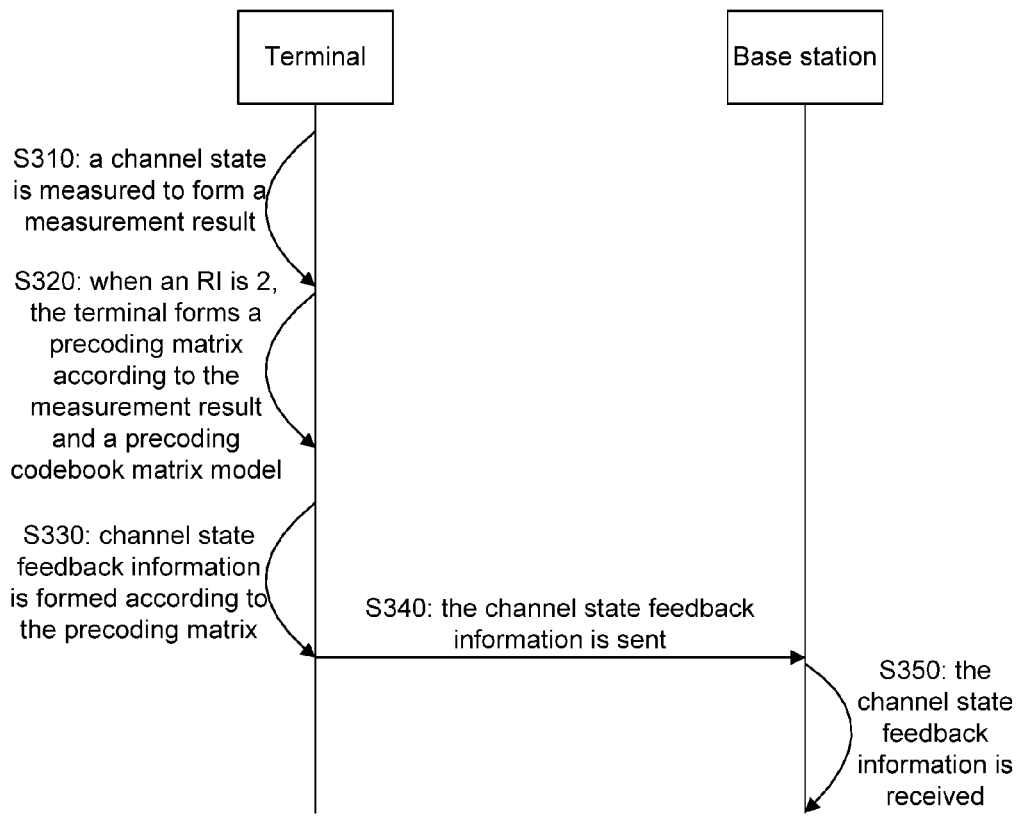
FIG. 3 is a third flowchart of a method for determining channel state feedback information according to an embodiment of the disclosure.

As shown in FIG. 3, a method for determining channel state feedback information during interaction between a base station and a terminal includes:

Step 310: the terminal measures a channel state to form a measurement result;

Step 320: when an RI is 2, the terminal forms a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors;

Step 330: the terminal forms channel state feedback information according to the precoding matrix;

Step 340: the channel state feedback information fed back by the terminal is received; and Step 350: a base station receives the channel state feedback information fed back by the terminal.

Specifically, Step 330 may include that: the terminal forms channel state feedback information including a codebook index according to the precoding matrix and a mapping relationship between precoding matrices and codebook indices; and data amount of the codebook index is smaller than those of the precoding matrix.

Correspondingly, Step 340 is implemented as follows: the channel state feedback information including the codebook indices is received; and in addition, the base station further determines the precoding matrix according to the codebook index and the mapping relationship between the precoding matrices and the codebook indices.

After receiving the precoding matrix, the base station selects a communication port or an antenna to communicate with the terminal according to the precoding matrix.

In a specific execution process, the codebook index is included in a Precoding Matrix Indicator (PMI). The channel state feedback information may further include rank information in a specific implementation process.

From the methods for determining channel state feedback information provided by the embodiments of the disclosure, firstly, a novel method for determining channel state feedback information is disclosed on the basis of the precoding codebook matrix model W compared with the conventional art; and secondly, with use of the codebook indices, the amount of information fed back to the base station by the terminal is reduced, so that higher precoding performance is achieved with limited uplink consumption.

The embodiments of the disclosure further provide a terminal, a base station and a communication system as implementation hardware for implementing the method at the terminal side, the method at the base station side and the method based on two sides.

Figure 4:
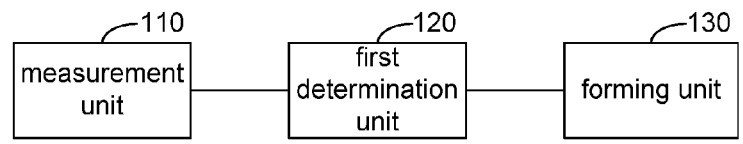
FIG. 4 is a structure diagram of a terminal according to an embodiment of the disclosure.

As shown in FIG. 4, the embodiment provides a terminal including:

a measurement unit 110, configured to measure a channel state to form a measurement result;

a first determination unit 120, configured to, when an RI is 2, form a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors; and a forming unit 130, configured to form channel state feedback information according to the precoding matrix.

A specific structure of the measurement unit may include a receiving antenna and a processor; and the processor forms the measurement result according to a signal parameter such as strength of a signal received by the receiving antenna and a pre-stored measurement strategy.

A specific structure of the first determination unit may include a storage medium. In an example embodiment, the storage medium is a non-transitory storage medium, and may be configured to store information such as the precoding codebook matrix model W; and in addition, the first determination unit may further include a processor, and the processor is connected with the storage medium, and reads the information in the storage medium to form the precoding matrix.

A specific structure of the forming unit may also include a processor, and the processor unlocks the information output by the first determination unit to form the channel state feedback information in a certain format, and feeds back it to a base station on a specified timeslot.

The processor may be an electronic component with a processing function such as a central processing unit, a microprocessor, a single-chip microcomputer, a digital signal processor or a programmable logic array or a combination of the electronic components; the measurement unit 110, the first determination unit 120 and the forming unit 130 may correspond to different processors respectively, and may also integrally correspond to one or more processors; and when two units correspond to the same processor, the processor may realize functions of different units by adopting time division multiplexing or different threads.

In a specific implementation process, the terminal further includes a sending unit; and a specific structure of the sending unit may include a sending antenna, configured to send the channel state feedback information to the base station.

The forming unit 110 includes:

a storage module, configured to store a mapping relationship between precoding matrices and codebook indices; and a forming module, configured to form channel state feedback information including a codebook index according to the precoding matrix and the mapping relationship between the precoding matrices and the codebook indices.

The storage module corresponds to a storage medium, such as a Read-Only Memory (ROM), a Random Access Memory (RAM), a Flash or compact disc and a U disk, and is a non-transitory storage medium in an example embodiment. The forming module corresponds to various types of processors in an example embodiment.

Figure 5:
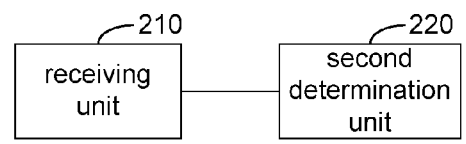
FIG. 5 is a structure diagram of a base station according to an embodiment of the disclosure.

As shown in FIG. 5, the embodiment of the disclosure further provides a base station, including:

a receiving unit 210, configured to receive channel state feedback information fed back by a terminal, when an RI is 2, the channel state feedback information is a precoding matrix formed according to a measurement result of channel measurement and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors.

The receiving unit includes receiving antennas or a receiving antenna array. The total number of antennas in the antenna array, configured to send and receive data, of the base station of the embodiment is not smaller than 8, and the antennas are usually arranged in multiple rows and multiple columns.

The receiving unit 210 is configured to receive channel state feedback information including a codebook index; data amount of the codebook index is smaller than that of the precoding matrix.

The base station further includes: a second determination unit 220, configured to determine the precoding matrix according to the codebook index and a mapping relationship between precoding matrices and codebook indices.

Figure 6:
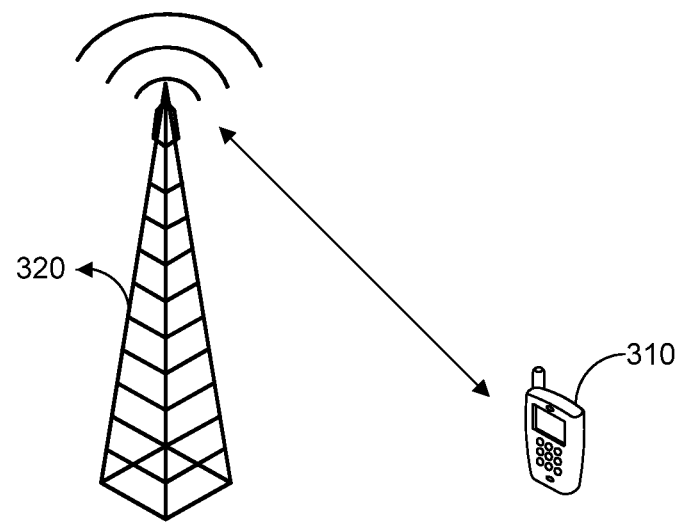
FIG. 6 is a structure diagram of a communication system according to an embodiment of the disclosure.

As shown in FIG. 6, the embodiment of the disclosure further provides a communication system, including:

a terminal 310, configured to measure a channel state to form a measurement result, when an RI is 2, form a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors, form channel state feedback information according to the precoding matrix, and send the channel state feedback information; and a base station 320, configured to receive the channel state feedback information fed back by the terminal.

In an example embodiment, the terminal 310 is configured to form channel state feedback information including a codebook index according to the precoding matrix and a mapping relationship between precoding matrices and codebook indices; data amount of the codebook indices is smaller than that of the precoding matrix; and the base station 320 is configured to receive the channel state feedback information fed back by the terminal, namely receive the channel state feedback information including the codebook index, and determine the precoding matrix according to the codebook index and the mapping relationship between the precoding matrices and the codebook indices.

The base station 320 and the terminal 310 are connected through a wireless network, and perform data transmission by virtue of a second-generation communication, third-generation communication, fourth-generation communication or fifth-generation communication technology. The base station may be an Evolved base station (eNB).

The following specific examples are provided below with reference to any technical solution of the embodiments.

Example 1

A precoding codebook matrix model stored by a base station or a terminal is $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_2$, $v_1$ and $v_3$ are all vectors of $$\left(\frac{N_t}{4}, 1\right);$$

and the vectors may be vectors or matrixes. $N_t$ represents the total number of ports or the total number of antennas.

When $N_t=32$ and RI=2, $v_0$, $v_2$, $v_1$ and $v_3$ are all vectors of 8×1. It is supposed that candidate vectors of $v_0$, $v_2$, $v_1$ and $v_3$ are shown in the following table:

| | $i_2$ | | | | | | | |
|---|---|---|---|---|---|---|---|---|
| $i_1$ | 0 | 1 | 2 | 3 | 4 | 5 | 6 | 7 |
| 0~15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
| | $i_2$ | | | | | | | |
| $i_1$ | 8 | 9 | 10 | 11 | 12 | 13 | 14 | 15 |
| 0~15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ |

Where $W^1_{m,n} = \frac{1}{\sqrt{8}} \begin{bmatrix} v_m \\ \phi_n v_m \end{bmatrix}$ Where, $\phi_n = e^{j\pi n/2}$ and $v_m = [1 \ e^{j2\pi m/32} \ e^{j4\pi m/32} \ e^{j6\pi m/32}]^T$.

The terminal selects a code word for reporting, where vectors $v_0$, $v_1$, $v_2$ and $v_3$ have a common candidate vector set A1, which is represented in Table 2-1 as that $v_0$, $v_1$, $v_2$ and $v_3$ have common $x_1$, and $x_1$ is indicated by i1. For example, the terminal calculates selected $x_1=0$ according to a Channel Quality Indicator (CQI), and then i1=0. The terminal selects and indicates $x_2$ of $v_0$ and $v_1$ by i2 on the basis of selected i1=0; and at this moment, if $v_0=v_1$, for example, $x_2=0$, i2=0. The terminal selects and indicates $x_2$ of $v_2$ and $v_3$ by i3; and at this moment, if $v_2=v_3$, for example, i2=1, i3=1. The terminal reports $(i_1,i_2,i_3)$ as: (0,0,1).

The base station selectively receives PMI information including i1, i2, and i3 from the terminal, and determines phase factors $\alpha_1$, $\alpha_2$ and $\beta$ in W, where $\beta$ is a fixed value, for example, $\beta=j$. $\alpha_1$ and $\alpha_2$ may be obtained according to vectors $v_0$, $v_1$, $v_2$ and $v_3$ fed back by the terminal, for example:

the base station obtains information $\alpha_1$ according to $v_0$, and the base station obtains information $\alpha_2=j$ according to $v_2$; the base station determines $v_0$ according to i1 and i2 fed back by the terminal, the obtained $v_0$ is vector:

$$\frac{1}{\sqrt[2]{2}} \cdot [1 \ 1 \ 1 \ 1 \ 1 \ 1 \ 1 \ 1]^T,$$

and at this moment, $\alpha_1=1$ may be obtained according to a product of a second element and seventh element of $v_0$; and the base station determines $v_2$ to obtain vector $$\frac{1}{\sqrt[2]{2}} \cdot [j \ j \ j \ j \ j \ j \ j \ j]^T$$

according to i1 and i3 fed back by the terminal, and similarly, $\alpha_2=j$ may be obtained according to $v_2$.

The base station obtains a final code word according to acquired precoding code word information, and precodes sent information.

Example 2

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix};$$

where $v_0$, $v_2$, and $v_3$ are all vectors of $$\left(\frac{N_t}{4}, 1\right);$$

and the vectors may be vectors or matrixes. $N_t$ represents the total number of ports or the total number of antennas.

When $N_t$=16 and RI=2, $v_0$, $v_2$, $v_1$ and $v_3$ are all vectors of 8×1.

It is supposed that candidate vectors of $v_0$, $v_2$, $v_1$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Where i1 indicates a common candidate vector set of $v_0$, $v_2$, $v_1$ and $v_3$; and the common candidate vector set is shown in the following table:

| | i1 Index | | | |
|---|---|---|---|---|
| | 0 | 1 | 2 | 3 |
| Index1 combination | {0, 1} | {2, 3} | {4, 5} | {6, 7} |

If an Index1 combination indicated by an i1 Index is {a,b}, a combination, indicated by i2, of $v_0$ and $v_1$ may be: {a,a}, {a,b}, {b,a} and {b,b}, and a combination, indicated by i3, of $v_2$ and $v_3$ is the same as that indicated by i2;

the terminal traverses code word combinations indicated by each i1 Index, and selects and determines i1=1 according to a CQI maximum principle;

the terminal selects and indicates $v_0$ and $v_1$ by i2 on the basis of the selected i1, and for example, if {a,b} is selected, i2=1; the terminal selects and indicates $v_2$ and $v_3$ by i3, and for example, if {b,b} is selected, i3=3; and the terminal reports $(i_1,i_2,i_3)$ as: (1,1,3).

The base station selectively receives PMI information from the terminal, and determines phase factors $\alpha_1$, $\alpha_2$ and $\beta$ in W where $\beta$ is a fixed value, for example, $$\beta = e^{j\frac{\pi}{4}}.$$

$\alpha_1$ and $\alpha_2$ may be obtained according to vectors $v_0$, $v_2$, $v_1$ and $v_3$ fed back by the terminal, for example:

the base station obtains $\alpha_1$ according to $v_0$ and $v_1$, and the base station obtains $\alpha_2$=j according to $v_2$ and $v_3$; the base station determines $v_0$ and $v_1$ according to i1 and i2 fed back by the terminal, $v_1$ is: $[1\ (-1+j)/\sqrt{2}\ -j\ (1+j)/\sqrt{2}]^T$ when $v_0$ is: $[1\ j\ -1\ -j]^T$, at this moment, a Discrete Fourier Transform (DFT) vector phase of vector $v_0$ is $\pi/2$, a DFT vector phase of $v_1$ is $3\pi/2$, and then $$\alpha_1 = e^{j\left(4\cdot\frac{\pi}{2}+\frac{3\pi}{2}\right)}$$

may be obtained according to formula $\alpha_1=e^{j(n\cdot\theta_0+\theta_1)}$, where n is the number of elements of vector $v_0$, $\theta_0=\pi/2$ and $\theta_1=3\pi/2$; and similarly, the base station determines $v_2$ and $v_3$ according to i1 and i3 fed back by the terminal, and $$\alpha_2 = e^{j\left(4\cdot\frac{3\pi}{2}+\frac{3\pi}{2}\right)}$$

may be obtained according to formula $\alpha_1=e^{j(n\cdot\theta_2+\theta_3)}$.

The base station obtains a final code word according to acquired precoding code word information, and precodes sent information.

Example 3

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_2$, $v_1$ and $v_3$ are all vectors of $$\left(\frac{N_t}{4}, 1\right);$$

and the vectors may be vectors or matrixes. $N_t$ represents the total number of ports or the total number of antennas.

When $N_t$=16 and RI=2, $v_0$, $v_2$, $v_1$ and $v_3$ are all vectors of 8×1.

It is supposed that $v_0$, $v_2$, $v_1$ and $v_3$ are from the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Where i1 indicates a combination of a common candidate vector set of $v_0$, $v_2$, $v_1$ and $v_3$ and $\beta$, as shown in the following table:

| i1 Index | 0 | 1 | 2 | 3 | 4 | 5 | 6 | 7 |
|---|---|---|---|---|---|---|---|---|
| Index1 combination | {0, 1} | {2, 3} | {4, 5} | {6, 7} | {0, 1} | {2, 3} | {4, 5} | {6, 7} |
| | $\beta = 1$ | $\beta = 1$ | $\beta = 1$ | $\beta = 1$ | $\beta = j$ | $\beta = j$ | $\beta = j$ | $\beta = j$ |

If an Index1 combination indicated by an i1 Index is {a,b}, a combination, indicated by i2, of $v_0$ and $v_1$ is shown in the following table:

| | i2 Index | | | |
|---|---|---|---|---|
| | 0 | 1 | 2 | 3 |
| $\{v_0, v_1\}$ | $\{a, a\}$ | $\{a, b\}$ | $\{b, a\}$ | $\{b, b\}$ | and a combination, indicated by i3, of $v_2$ and $v_3$ is shown in the following table:

| | i3 Index | | | |
|---|---|---|---|---|
| | 0 | 1 | 2 | 3 |
| $\{v_2, v_3\}$ | $\{a, a\}$ | $\{a, b\}$ | $\{b, a\}$ | $\{b, b\}$ |

The terminal traverses code word combinations indicated by each i1 Index, and selects and determines i1=1 according to a CQI maximum principle;

the terminal selects and indicates $v_0$ and $v_1$ by i2 on the basis of the selected i1, and for example, if $\{a,b\}$ is selected, i2=1; the terminal selects and indicates $v_2$ and $v_3$ by i3, and for example, if $\{b,b\}$ is selected, i3=3; and the terminal reports $(i_1, i_2, i_3)$ as: $(1,1,3)$.

The base station selectively receives PMI information including $(i_1, i_2, i_3)$ from the terminal, may obtain $\beta=1$ according to the PMI information, and may obtain $\alpha_1$ and $\alpha_2$ according to vectors $v_0$, $v_2$, $v_1$ and $v_3$ fed back by the terminal, and a specific operating manner is described in the corresponding part in example 1 or 2.

The base station obtains a final code word according to acquired precoding code word information, and precodes sent information.

Example 4

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_2$, $v_1$ and $v_3$ are all vectors of $$\left(\frac{N_t}{3}, 1\right);$$

and the vectors may be vectors or matrixes. $N_t$ represents the total number of ports or the total number of antennas.

When $N_t=32$ and RI=2, $v_0$, $v_2$, $v_1$ and $v_3$ are all vectors of 8×1.

It is supposed that $v_0$, $v_2$, $v_1$ and $v_3$ are R118Tx Rank1 code words, specifically as shown in the following table:

| | $i_2$ | | | | | | | |
|---|---|---|---|---|---|---|---|---|
| $i_1$ | 0 | 1 | 2 | 3 | 4 | 5 | 6 | 7 |
| 0~15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | $i_2$ | | | | | | | |
| $i_1$ | 8 | 9 | 10 | 11 | 12 | 13 | 14 | 15 |
| 0~15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

Where $W_{m,n}^1 = \frac{1}{\sqrt{8}} \begin{bmatrix} v_m \\ \phi_n v_m \end{bmatrix}$ Where, $\phi_n = e^{j\pi n/2}$ and $v_m = [1\ e^{j2\pi n/32}\ e^{j4\pi n/32}\ e^{j6\pi n/32}]^T,$ where $x_1$ is indicated by i1, and $x_2$ is indicated by i2.

Phase factor $\beta$ is selected by the terminal, and its candidate set is shown in the following table:

| Index1 | 0 | 1 | 2 | 3 | 4 | 5 | 6 | 7 |
|---|---|---|---|---|---|---|---|---|
| Phase factor | 1 | $e^{j\frac{\pi}{4}}$ | $j$ | $e^{j\frac{3\pi}{4}}$ | $-1$ | $e^{j\frac{5\pi}{4}}$ | $-j$ | $e^{j\frac{7\pi}{4}}$ |

The terminal traverses each code word in the table, selects and indicates $x_1$ by i1 for vectors $v_0$, $v_2$, $v_1$ and $v_3$ according to a maximum signal to noise ratio principle, for example, i1=3, and selects and indicates $x_2$ by i2 for $v_0$, $v_2$, $v_1$ and $v_3$, $v_0=v_1=v_2=v_3$ at this moment, on the basis of selected $x_1$, for example i2=0. The terminal traverses options of $\beta$, and selects and indicates the most proper Index1 by i3, for example i3=4. The terminal reports $(i_1, i_2, i_3)$ as $(3,0,4)$.

The base station selectively receives PMI information from the terminal, may obtain $\beta=-1$ according to the PMI information, and may obtain $\alpha_1$ and $\alpha_2=j$ according to vectors $v_0$, $v_2$, $v_1$ and $v_3$ fed back by the terminal, and a specific operating manner is described in example 1 or 2.

The base station obtains a final code word according to acquired precoding code word information, and precodes sent information.

Example 5

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_2$, $v_1$ and $v_3$ are all matrixes or vectors of ($N_t/4$), and $N_t$ is the total number of communication ports or the total number of antennas, and is not smaller than 8; and when $N_t$=16 and RI=2, $v_0$, $v_2$, $v_1$ and $v_3$ are all vectors of 4×1.

It is supposed that candidate vectors of $v_0$, $v_2$, $v_1$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Where, i1 indicates a common vector set of $v_0$, $v_2$, $v_1$ and $v_3$, specifically as shown in the following table:

| | i1 Index | | | |
|---|---|---|---|---|
| | 0 | 1 | 2 | 3 |
| Index1 combination | {0, 1} | {2, 3} | {4, 5} | {6, 7} |

If an Index1 combination indicated by an i1 Index is {a,b}, a combination, indicated by i2, of $v_0$, $v_2$, $v_1$ and $v_3$ may be shown in the following table:

| i2 Index | 0 | 1 | 2 | 3 |
|---|---|---|---|---|
| $\begin{bmatrix} v_0 & v_2 \\ v_1 & v_3 \end{bmatrix}$ | $\begin{bmatrix} a & a \\ a & a \end{bmatrix}$ | $\begin{bmatrix} a & b \\ a & b \end{bmatrix}$ | $\begin{bmatrix} a & a \\ b & b \end{bmatrix}$ | $\begin{bmatrix} b & b \\ b & b \end{bmatrix}$ |

Options, indicated by i3, of β are shown in the following table:

| i3 Index | 0 | 1 | 2 | 3 |
|---|---|---|---|---|
| β | 1 | $e^{j\frac{\pi}{4}}$ | j | $e^{j\frac{3\pi}{4}}$ |

The terminal traverses code words indicated by each i1 Index, and selects i1=1 according to a CQI maximum principle;

the terminal selects and indicates $v_0$, $v_2$, $v_1$ and $v_3$ by i2 on the basis of selected i1, and for example, if $$\begin{bmatrix} a & b \\ a & b \end{bmatrix}$$

is selected, i2=1; the terminal selects and indicates β by i3, and for example, if β=1 is selected, i3=0; and the terminal reports ($i_1,i_2,i_3$) as (1,1,0).

The base station selectively receives PMI information from the terminal, may obtain β=1 according to the PMI information, and may obtain $\alpha_1$ and $\alpha_2$=j according to vectors $v_0$, $v_2$, $v_1$ and $v_3$ fed back by the terminal, and a specific operating manner is described in example 1 or 2.

The base station obtains a final code word according to acquired precoding code word information, and precodes sent information.

Example 6

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of ($N_t/4$), and $N_t$ is the total number of ports or the total number of antennas, and is an integer more than or equal to 8.

When $N_t$=16 and RI=2, $v_0$, $v_1$, $v_2$ and $v_3$ are all vectors of 8×1. β is a fixed value.

It is supposed that candidate vectors of $v_0$, $v_1$, $v_2$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Herein i1 indicates a combination of a common candidate vector set of $v_0$, $v_1$, $v_2$ and $v_3$, $\alpha_1$ and $\alpha_2$, specifically as shown in the following table:

| i1 Index | 0 | 1 | 2 | 3 |
|---|---|---|---|---|
| Index1 combination | {0, 1} | {2, 3} | {4, 5} | {6, 7} |
| | $\alpha_1 = 1$ | $\alpha_1 = 1$ | $\alpha_1 = e^{j\frac{\pi}{4}}$ | $\alpha_1 = e^{j\frac{\pi}{4}}$ |
| | $\alpha_2 = j = 1$ | $\ldots = j$ | $\alpha_2 = j = j$ | $\alpha_2 = j = -j$ |

If an Index1 combination indicated by an i1 Index is {a,b}, a combination, indicated by i2, of $v_0$ and $v_1$ may be: {a,a}, {a,b}, {b,a} and {b,b}, and a combination, indicated by i3, of $v_2$ and $v_3$ is the same as that indicated by i2;

the terminal traverses code word combinations indicated by each i1 Index, and selects i1=3 according to a CQI maximum principle;

the terminal selects and indicates $v_0$ and $v_1$ by i2 on the basis of selected i1, and for example, if {a,b} is selected, i2=1; the terminal selects and indicates $v_2$ and $v_3$ by i3, and for example, if {b,b} is selected, i3=3; and the terminal reports ($i_1,i_2,i_3$) as: (3,1,3).

The base station selectively receives PMI information from the terminal, and may determine phase factors $\alpha_1$ and $\alpha_2$=j, $v_0$, $v_1$, $v_2$ and $v_3$ in a code word model according to the PMI information. The base station may combine the information to obtain a code word required to be reported by the terminal.

Example 7

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ is the total number of ports or the total number of antennas, and is an integer more than or equal to 8.

When $N_t=16$ and RI=2, $v_0$, $v_1$, $v_2$ and $v_3$ are all vectors of 8×1; and $\beta$ is a fixed value, and for example, $$\beta = e^{j\frac{\pi}{4}}.$$

It is supposed that candidate vectors of $v_0$, $v_1$, $v_2$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Herein i1 indicates a combination of a common candidate vector set of $v_0$, $v_1$, $v_2$ and $v_3$, $\alpha_1$ and $\alpha_2$, specifically as shown in the following table:

| i1 Index | 0 | 1 | 2 | 3 | 4 | 5 | 6 | 7 |
|---|---|---|---|---|---|---|---|---|
| Index1 combination $v_0$, $v_1$/$v_2$, $v_3$ | {0, 1} | {0, 1} | {2, 3} | {2, 3} | {4, 5} | {4, 5} | {6, 7} | {6, 7} |
| $\alpha_1/\alpha_2 = j$ | $\{1, e^{j\frac{\pi}{4}}\}$ | $\{j, e^{j\frac{3\pi}{4}}\}$ | $\{-1, e^{j\frac{5\pi}{4}}\}$ | $\{-j, e^{j\frac{7\pi}{4}}\}$ | $\{1, e^{j\frac{\pi}{4}}\}$ | $\{j, e^{j\frac{3\pi}{4}}\}$ | $\{-1, e^{j\frac{5\pi}{4}}\}$ | $\{-j, e^{j\frac{7\pi}{4}}\}$ |

If an Index1 combination indicated by an i1 Index is {a,b}, a combination, indicated by i2, of $v_0$ and $v_1$ may be: {a,a}, {a,b}, {b,a} and {b,b}, and a combination, indicated by i3, of $v_2$ and $v_3$ may also be {a,a}, {a,b}, {b,a} and {b,b}, specifically as shown in the following tables:

| i2 index | 0 | 1 | 2 | 3 | 4 | 5 | 6 | 7 |
|---|---|---|---|---|---|---|---|---|
| $v_0$, $v_1$ | {a, a} | {a, a} | {a, b} | {a, b} | {b, a} | {b, a} | {b, b} | {b, b} |
| $\alpha_1$ | 1 | $e^{j\frac{\pi}{4}}$ | $j$ | $e^{j\frac{3\pi}{4}}$ | $-1$ | $e^{j\frac{5\pi}{4}}$ | $-j$ | $e^{j\frac{7\pi}{4}}$ |

| i3 index | 0 | 1 | 2 | 3 | 4 | 5 | 6 | 7 |
|---|---|---|---|---|---|---|---|---|
| $v_2$, $v_3$ | {a, a} | {a, a} | {a, b} | {a, b} | {b, a} | {b, a} | {b, b} | {b, b} |
| $\alpha_2 = j$ | 1 | $e^{j\frac{\pi}{4}}$ | $j$ | $e^{j\frac{3\pi}{4}}$ | $-1$ | $e^{j\frac{5\pi}{4}}$ | $-j$ | $e^{j\frac{7\pi}{4}}$ |

The terminal traverses code word combinations indicated by each i1 Index, and selects i1=7 according to a CQI maximum principle. The terminal selects and indicates $v_0$, $v_1$ and $\alpha_1$ by i2 on the basis of the selected i1, and for example, if {a,b} and $\alpha_1=j$ are selected, i2=2; the terminal selects and indicates $v_2$ and $v_3$ by i3, and for example, if {b,b} and $\alpha_2=j=-j$ are selected, i3=6; and the terminal reports $(i_1,i_2,i_3)$ as: (7,2,6).

The base station selectively receives PMI information from the terminal, and may determine phase factors $\alpha_i$ and $\alpha_2=j$, $v_0$, $v_1$, $v_2$ and $v_3$ in a code word model according to the PMI information. The base station may combine the information to obtain a code word required to be reported by the terminal.

Example 8

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ represents the total number of ports or the total number of antennas, and is an integer more than or equal to 8.

When $N_t=16$ and RI=2, $v_0$, $v_1$, $v_2$ and $v_3$ are all vectors of 8×1; and $\beta$ is a fixed value.

It is supposed that candidate vectors of $v_0$, $v_1$, $v_2$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Herein i1 indicates a combination of a common candidate vector set of $v_0$, $v_1$, $v_2$ and $v_3$, $\alpha_1$ and $\alpha_2=j$, $v_0=v_1=v_2=v_3$, specifically as shown in the following table:

| i1 Index | 0 | 1 | 2 | 3 |
|---|---|---|---|---|
| Index1 combination $v_0, v_1/v_2, v_3$ | {0, 1, 2, 3} | {4, 5, 6, 7} | {0, 1, 2, 3} | {4, 5, 6, 7} |
| $\alpha_1/\alpha_2 = j$ | $\{1, e^{j\frac{\pi}{4}}, j, e^{j\frac{3\pi}{4}}\}$ | $\{1, e^{j\frac{\pi}{4}}, j, e^{j\frac{3\pi}{4}}\}$ | $\{-1, e^{j\frac{5\pi}{4}}, -j, e^{j\frac{7\pi}{4}}\}$ | $\{-1, e^{j\frac{5\pi}{4}}, -j, e^{j\frac{7\pi}{4}}\}$ |

If a vector combination indicated by i1 is {a,b,c,d}, vectors selected by i2 may be represented in the following table:

| | i2 index | | | |
|---|---|---|---|---|
| | 0 | 1 | 2 | 3 |
| $v_0$~$v_3$ | a | b | c | d |

If a phase combination indicated by i1 is {g,k,f,x}, phase factors selected by i3 may be represented in the following table:

| i3 Index | 0 | 1 | 2 | 3 | 4 | 5 | 6 | 7 |
|---|---|---|---|---|---|---|---|---|
| $\alpha_1/\alpha_2 = j$ | {g, g} | {k, k} | {f, f} | {x, x} | {g, k} | {g, f} | {k, x} | {f, x} |

The terminal traverses code word combinations indicated by each i1 Index, and selects i1=0 according to a CQI maximum principle;

the terminal selects and indicates $v_0$, $v_1$, $v_2$ and $v_3$ by i2 on the basis of the selected i1, and for example, if i2=0 is selected, vector $[1\ 1\ 1\ 1]^T$ is indicated; the terminal selects phase factors indicated by i3, and for example, if {x,x} is selected, i3=3; and the terminal reports $(i_1,i_2,i_3)$ as: (0,0,3).

The base station selectively receives PMI information from the terminal, and may determine phase factors $\alpha_1$ and $\alpha_2=j$, $v_0$, $v_1$, $v_2$ and $v_3$ in a code word model according to the PMI information. The base station may combine the information to obtain a code word $$\begin{bmatrix} v_0 & v_3 \\ e^{j\frac{3\pi}{4}} \cdot v_0 & e^{j\frac{3\pi}{4}} \cdot v_0 \\ e^{j\frac{\pi}{4}} \cdot v_0 & -e^{j\frac{\pi}{4}} \cdot v_0 \\ -v_0 & v_0 \end{bmatrix}$$

required to be reported by the terminal, where $$v_0 = [1\ 1\ 1\ 1]^T \cdot \begin{bmatrix} v_0 & v_3 \\ e^{j\frac{3\pi}{4}} \cdot v_0 & e^{j\frac{3\pi}{4}} \cdot v_0 \\ e^{j\frac{\pi}{4}} \cdot v_0 & -e^{j\frac{\pi}{4}} \cdot v_0 \\ -v_0 & v_0 \end{bmatrix}$$

is a precoding matrix required to be fed back to the base station by the terminal.

Example 9

A base station or a terminal stores $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_2$, $v_2$ and $v_3$ are all matrixes or vectors of $(N_t/4)$, and $N_t$ represents the total number of ports or the total number of antennas, and is an integer more than or equal to 8. When $N_t$=16 and RI=2, $v_0$, $v_1$, $v_2$ and $v_3$ are all vectors of 8×1.

It is supposed that candidate vectors of $v_0$, $v_1$, $v_2$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Herein i1 indicates a combination of a common candidate vector set of $v_0$, $v_1$, $v_2$ and $v_3$, $\alpha_1$, $\alpha_2$ and $\beta$, specifically as shown in the following table:

| i1 Index | 0 | 1 | 2 | 3 |
|---|---|---|---|---|
| Index1 combination | {0, 1} | {2, 3} | {4, 5} | {6, 7} |
| | $\alpha_1 = 1$ | $\alpha_1 = 1$ | $\alpha_1 = e^{j\frac{\pi}{4}}$ | $\alpha_1 = e^{j\frac{\pi}{4}}$ |
| | $\alpha_2 = j = 1$ | $\alpha_2 = j = j$ | $\alpha_2 = j = j$ | $\alpha_2 = j = -j$ |
| | $\beta = 1$ | $\beta = j$ | $\beta = e^{j\frac{\pi}{4}}$ | $\beta = -j$ |

If an Index1 combination indicated by an i1 Index is {a,b}, a combination, indicated by i2, of $v_0$ and $v_1$ may be: {a,a}, {a,b}, {b,a} and {b,b}, and a combination, indicated by i3, of $v_2$ and $v_3$ is the same as that indicated by i2;

the terminal traverses code word combinations indicated by each i1 Index, and selects i1=2 according to a CQI maximum principle;

the terminal selects and indicates $v_0$ and $v_1$ by i2 on the basis of the selected i1, and for example, if {a,b} is selected, i2=1; the terminal selects and indicates $v_2$ and $v_3$ by i3, and for example, if {b,a} is selected, i3=2; and the terminal reports $(i_1,i_2,i_3)$ as: (2,1,2).

The base station selectively receives PMI information from the terminal, and may determine phase factors $\alpha_1$, $\alpha_2=j$ and $\beta$, $v_0$, $v_1$, $v_2$ and $v_3$ in a code word model according to the PMI information. The base station may combine the information to obtain a code word required to be reported by the terminal.

Example 10

A base station or a terminal stores $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ represents the total number of ports or the total number of antennas, and is an integer more than or equal to 8. When $N_t=16$ and RI=2, $v_0$, $v_1$, $v_2$ and $v_3$ are all vectors of 8×1.

It is supposed that candidate vectors of $v_0$, $v_1$, $v_2$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Herein i1 indicates a combination of a common candidate vector set of $v_0$, $v_1$, $v_2$ and $v_3$, $\alpha_1$, $\alpha_2=j$ and $\beta$, $v_0=v_1=v_2=v_3$, specifically as shown in the following table:

| i1 Index | 0 | 1 | 2 | 3 |
|---|---|---|---|---|
| Index1 combination $v_0$, $v_1$/$v_2$, $v_3$ | {0, 1, 2, 3} | {4, 5, 6, 7} | {0, 1, 2, 3} | {4, 5, 6, 7} |
| $\alpha_1/\alpha_2 = j/\beta$ | $\{1, e^{j\frac{\pi}{4}}, j, e^{j\frac{3\pi}{4}}\}$ | $\{1, e^{j\frac{\pi}{4}}, j, e^{j\frac{3\pi}{4}}\}$ | $\{-1, e^{j\frac{5\pi}{4}}, -j, e^{j\frac{7\pi}{4}}\}$ | $\{-1, e^{j\frac{5\pi}{4}}, -j, e^{j\frac{7\pi}{4}}\}$ |

If a vector combination indicated by i1 is {a,b,c,d}, vectors selected by i2 may be represented in the following table:

| | i2 index | | | |
|---|---|---|---|---|
| | 0 | 1 | 2 | 3 |
| $v_0$~$v_3$ | a | b | c | d |

If a phase combination indicated by i1 is {g,k,f,x}, phase factors selected by i3 may be represented in the following table:

| i3 Index | 0 | 1 | 2 | 3 | 4 | 5 | 6 | 7 |
|---|---|---|---|---|---|---|---|---|
| $\alpha_1$ $\alpha_2 = j$ $\beta$ | {g, g, g} | {k, k, g} | {f, f, g} | {x, x, f} | {g, k, g} | {g, f, f} | {k, x, g} | {f, x, f} |

The terminal traverses code word combinations indicated by each i1 Index, and selects i1=0 according to a CQI maximum principle;

the terminal selects and indicates $v_0$, $v_1$, $v_2$ and $v_3$ by i2 on the basis of the selected i1, and for example, if i2=0 is selected, vector $[1\ 1\ 1\ 1]^T$ is indicated; the terminal selects phase vectors indicated by i3, and for example, if {x,x,f} is selected, that is, $$\alpha_1 = e^{j\frac{3\pi}{4}}, \alpha_2 = j = e^{j\frac{3\pi}{4}}$$

and $\beta=j$, i3=3; and the terminal reports $(i_1,i_2,i_3)$ as: (0,0,3).

The base station selectively receives PMI information from the terminal, and may determine phase factors $\alpha_1$, $\alpha_2=j$ and $\beta$, $v_0$, $v_1$, $v_2$ and $v_3$ in a code word model according to the PMI information. The base station may combine the information to obtain a code word required to be reported by the terminal.

Example 11

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ represents the total number of ports or the total number of antennas, and is an integer more than or equal to 8. When $N_t=16$ and RI=2, $v_0$, $v_1$, $v_2$ and $v_3$ are all vectors of 4×1; and $\beta$ is a fixed value, and for example, $\beta=1$.

| | | | | $x_2$ | | | | |
|---|---|---|---|---|---|---|---|---|
| $x_1$ | 0 | 1 | 2 | 3 | 4 | 5 | 6 | 7 |
| 0~15 | $W_{x_1,0}^{(1)}$ | $W_{x_1,1}^{(1)}$ | $W_{x_1,2}^{(1)}$ | $W_{x_1,3}^{(1)}$ | $W_{x_1+8,0}^{(1)}$ | $W_{x_1+8,1}^{(1)}$ | $W_{x_1+8,2}^{(1)}$ | $W_{x_1+8,3}^{(1)}$ |

| | | | | $x_2$ | | | | |
|---|---|---|---|---|---|---|---|---|
| $x_1$ | 8 | 9 | 10 | 11 | 12 | 13 | 14 | 15 |
| 0~15 | $W_{x_1+16,0}^{(1)}$ | $W_{x_1+16,1}^{(1)}$ | $W_{x_1+16,2}^{(1)}$ | $W_{x_1+16,3}^{(1)}$ | $W_{x_1+24,0}^{(1)}$ | $W_{x_1+24,1}^{(1)}$ | $W_{x_1+24,2}^{(1)}$ | $W_{x_1+24,3}^{(1)}$ |

Where $W_{m,n}^1 = \frac{1}{\sqrt{2}} \begin{bmatrix} v_m \\ e^{j\frac{n\pi}{8}} \cdot e^{j\frac{m\pi}{8}} v_m \end{bmatrix}$  $v_m = [\ 1\ \ e^{j2\pi m/32}\ ]^T$ The terminal selects a code word for reporting, where vectors $v_0$ and $v_1$ have a common candidate vector set $x_1$ indicated by i1, and for example, the terminal calculates the most proper code word: $x_1=0$, according to a CQI, and at this moment, i1=0; and the terminal selects and indicates $x_2$ by i2 for $v_0$ and $v_1$ on the basis of selected $x_1=0$, $v_0=v_1$, and for example, if $x_2=1$ is selected, i2=1.

The terminal multiplies $v_0$ and $v_1$ by matrix Rot to obtain $v_2$ and $v_3$, and indicates an option of matrix Rot by i3, and for example, when Rot is a 4×4 matrix:

| i3 index | Rot matrix |
|---|---|
| 0 | diag([1 1 1 1]) |
| 1 | diag($[\ 1\ \ e^{j\frac{\pi}{8}}\ \ e^{j\frac{2\pi}{8}}\ \ e^{j\frac{3\pi}{8}}\ ]$) |
| 2 | diag($[\ 1\ \ e^{j\frac{-\pi}{8}}\ \ e^{j\frac{-2\pi}{8}}\ \ e^{j\frac{-3\pi}{8}}\ ]$) |
| 3 | Reserved |

The terminal selects Index=0 according to a CQI maximum principle after traversing, and then i3=0. The terminal reports $(i_1,i_2,i_3)$ as: (0,1,0). The base station selectively receives PMI information from the terminal, and determines phase factors $\alpha_1$ and $\alpha_2=j$ in a code word model, and $\alpha_1$ and $\alpha_2=j$ may be obtained according to vectors $v_0$, $v_1$, $v_2$ and $v_3$ fed back by the terminal, for example:

the base station obtains information $\alpha_1$ according to vector $v_0$, and the base station obtains information $\alpha_2=j$ according to vector $v_2$; the base station determines $v_0$ according to i1 and i2 fed back by the terminal, the obtained $v_0$ is vector: $\frac{1}{2} \cdot [1\ 1\ j\ j]^T$, and at this moment, $\alpha_1=j$ may be obtained according to a product of a second element and seventh element of $v_0$; and the base station determines $v_2$ to obtain vector $\frac{1}{2} \cdot [1\ 1\ 1\ 1]^T$ according to i1, i2 and i3 fed back by the terminal, and similarly, $\alpha_2=j=1$ may be obtained according to $v_2$. The base station obtains a final code word according to acquired precoding code word information, and precodes sent information.

Example 12

Matrix Rot indicated by i3 in example 11 may also be $N_t/2 \times N_t/2$-dimensional, $\begin{bmatrix} v_2 \\ v_3 \end{bmatrix} = Rot \times \begin{bmatrix} v_0 \\ v_1 \end{bmatrix}$, and for example 11, the Rot matrix may also be an 8×8 matrix:

| i3 index | Rot matrix |
|---|---|
| 0 | diag([1 1 1 1 1 1 1 1]) |
| 1 | diag($[\ 1\ \ e^{j\frac{\pi}{8}}\ \ e^{j\frac{2\pi}{8}}\ \ e^{j\frac{3\pi}{8}}\ \ e^{j\frac{4\pi}{8}}\ \ e^{j\frac{5\rho}{8}}\ \ e^{j\frac{6\pi}{8}}\ \ e^{j\frac{7\pi}{8}}\ ]$) |
| 2 | diag($[\ 1\ \ e^{j\frac{-\pi}{8}}\ \ e^{j\frac{-2\pi}{8}}\ \ e^{j\frac{-3\pi}{8}}\ \ e^{j\frac{-4\pi}{8}}\ \ e^{j\frac{-5\rho}{8}}\ \ e^{j\frac{-6\pi}{8}}\ \ e^{j\frac{-7\pi}{8}}\ ]$) |
| 3 | Reserved |

The terminal selects Index=0 according to a CQI maximum principle after traversing, and then i3=0. The terminal reports $(i_1,i_2,i_3)$ as: (0,1,0). The base station selectively receives PMI information from the terminal, and determines phase factor $\alpha_1$ and $v_2$ in a code word model, and $\alpha_1$ and $\alpha_2=j$ may be obtained according to vectors $v_0$, $v_1$, $v_2$ and $v_3$ fed back by the terminal, for example: the base station obtains information $\alpha_1$ according to vector $v_0$, and the base station obtains information $\alpha_2=j$ according to vector $v_2$; the base station determines $v_0$ and $v_1$ according to i1 and i2 fed back by the terminal, the obtained $v_0$ and $v_1$ are vectors: $\frac{1}{2} \cdot [1\ 1\ j\ j]^T$, and at this moment, $\alpha_1=j$ may be obtained according to a product of a second element and seventh element of $v_0$; and the base station determines $v_2$ and $v_3$ according to i1, i2 and i3 fed back by the terminal, and similarly, $\alpha_2=j=1$ may be obtained according to $v_2$.

The base station obtains a final code word according to acquired precoding code word information, and precodes sent information.

Example 13

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ represents the total number of ports or the total number of antennas, and is an integer more than or equal to 8.

When $N_t=16$ and RI=2, $v_0$, $v_1$, $v_2$ and $v_3$ are all vectors of 4×1. In the model, $\alpha_1$ and $\alpha_2=j$ are determined by the base station, the terminal and the base station store the same $\alpha_1$ and $\alpha_2=j$ configurations, and for example, $\alpha_1=1$ and $\alpha_2=j=1$; or $\alpha_1$ and c are obtained by the base station according to CSI fed back by the terminal, and an obtaining manner is the same as those in the abovementioned examples.

A candidate vector set is: $W = W_1 \cdot W_2$.

|  | $x_2$ | | | | | | | |
|---|---|---|---|---|---|---|---|---|
| $x_1$ | 0 | 1 | 2 | 3 | 4 | 5 | 6 | 7 |
| 0~15 | $W_{x_1,0}^{(1)}$ | $W_{x_1,1}^{(1)}$ | $W_{x_1,2}^{(1)}$ | $W_{x_1,3}^{(1)}$ | $W_{x_1+8,0}^{(1)}$ | $W_{x_1+8,1}^{(1)}$ | $W_{x_1+8,2}^{(1)}$ | $W_{x_1+8,3}^{(1)}$ |
|  | $x_2$ | | | | | | | |
| $x_1$ | 8 | 9 | 10 | 11 | 12 | 13 | 14 | 15 |
| 0~15 | $W_{x_1+16,0}^{(1)}$ | $W_{x_1+16,1}^{(1)}$ | $W_{x_1+16,2}^{(1)}$ | $W_{x_1+16,3}^{(1)}$ | $W_{x_1+24,0}^{(1)}$ | $W_{x_1+24,1}^{(1)}$ | $W_{x_1+24,2}^{(1)}$ | $W_{x_1+24,3}^{(1)}$ |

Where $W_{m,n}^1 = \frac{1}{\sqrt{2}} \begin{bmatrix} v_m \\ e^{j\frac{n\pi}{8}} \cdot e^{j\frac{m\pi}{8}} v_m \end{bmatrix}$ $v_m = [\ 1\ \ e^{j2\pi m/32}\ ]^T$ The terminal selects a code word for reporting, where vectors $v_0$ and $v_1$ have a common candidate vector set $x_1$ indicated by i1, and meanwhile, i1 also indicates information about phase factor β, specifically as shown in the following table:

|  | i1 Index | |
|---|---|---|
|  | 0-15 | 16-31 |
| $W_1$ and β combination | $x_1$ (n = 0, 1, ..., 15) β = 1 | $x_1$ (n = 0, 1, ..., 15) β = j |

For example, the terminal calculates the most proper code word: $x_1$=0, according to a CQI, β=1, and at this moment, i1=0; and the terminal selects and indicates $x_2$ by i2 for $v_0$ and $v_1$ on the basis of selected $x_1$=0, $v_0$=$v_1$, and for example, if Index=1 is selected, i2=1.

The terminal multiplies $v_0$ and $v_1$ by matrix Rot to obtain $v_2$ and $v_3$, and indicates an option of matrix Rot by i3, and for example, when Rot is a 4×4 matrix, they may specifically be represented in the following table:

| i3 index | Rot matrix |
|---|---|
| 0 | diag ([1 1 1 1]) |
| 1 | diag ($[\ 1\ \ e^{j\frac{\pi}{8}}\ \ e^{j\frac{2\pi}{8}}\ \ e^{j\frac{3\pi}{8}}\ ]$) |
| 2 | diag ($[\ 1\ \ e^{j\frac{-\pi}{8}}\ \ e^{j\frac{-2\pi}{8}}\ \ e^{j\frac{-3\pi}{8}}\ ]$) |
| 3 | Reserved |

The terminal selects Index=0 according to a CQI maximum principle after traversing, and then i3=0. The terminal reports $(i_1,i_2,i_3)$ as: (0,1,0). The base station selectively receives PMI information from the terminal, and determines phase factors $\alpha_1$ and $\alpha_2$=j in a code word model, and $\alpha_1$ and $\alpha_2$=j may be obtained according to vectors $v_0$, $v_1$, $v_2$ and $v_3$ fed back by the terminal. The base station obtains a final code word according to acquired precoding code word information, and precodes sent information.

Example 14

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ represents the total number of ports or the total number of antennas, and is an integer more than or equal to 8.

When $N_t$=16 and RI=2, $v_0$, $v_1$, $v_2$ and $v_3$ are all vectors of 4×1; and β is a fixed value.

A candidate vector set of W is shown in the following table:

|  | $x_2$ | | | | | | | |
|---|---|---|---|---|---|---|---|---|
| $x_1$ | 0 | 1 | 2 | 3 | 4 | 5 | 6 | 7 |
| 0~15 | $W_{x_1,0}^{(1)}$ | $W_{x_1,1}^{(1)}$ | $W_{x_1,2}^{(1)}$ | $W_{x_1,3}^{(1)}$ | $W_{x_1+8,0}^{(1)}$ | $W_{x_1+8,1}^{(1)}$ | $W_{x_1+8,2}^{(1)}$ | $W_{x_1+8,3}^{(1)}$ |
|  | $x_2$ | | | | | | | |
| $x_1$ | 8 | 9 | 10 | 11 | 12 | 13 | 14 | 15 |
| 0~15 | $W_{x_1+16,0}^{(1)}$ | $W_{x_1+16,1}^{(1)}$ | $W_{x_1+16,2}^{(1)}$ | $W_{x_1+16,3}^{(1)}$ | $W_{x_1+24,0}^{(1)}$ | $W_{x_1+24,1}^{(1)}$ | $W_{x_1+24,2}^{(1)}$ | $W_{x_1+24,3}^{(1)}$ |

Where $W_{m,n}^1 = \frac{1}{\sqrt{2}} \begin{bmatrix} v_m \\ e^{j\frac{n\pi}{8}} \cdot e^{j\frac{m\pi}{8}} v_m \end{bmatrix}$ $v_m = [\ 1\ \ e^{j2\pi m/32}\ ]^T$ The terminal selects a code word for reporting, where vectors $v_0$ and $v_1$ have a common candidate vector set $x_1$ indicated by i1, and meanwhile, i1 also indicates information about phase factors $\alpha_1$ and $\alpha_2$, specifically as shown in the following table:

|  | i1 Index | |
|---|---|---|
|  | 0–15 | 16–31 |
| $x_1$, $\alpha_1$ and $\alpha_2$ combination | $x_1$ (n = 0, 1, ..., 15) $\alpha_1 = 1$ $\alpha_2 = 1$ | $x_1$ (n = 0, 1, ..., 15) $\alpha_1 = j$ $\alpha_2 = j$ |

For example, the terminal calculates the most proper code word: $x_1=0$, according to a CQI, $\alpha_1=1$, $\alpha_2=j=1$, and at this moment, i1=0; and the terminal selects and indicates $x_2$ by i2 for $v_0$ and $v_1$ on the basis of selected $x_1=0$, $v_0=v_1$, and for example, if Index=1 is selected, i2=1.

The terminal multiplies $v_0$ and $v_1$ by matrix Rot to obtain $v_2$ and $v_3$, and indicates an option of matrix Rot by i3, and for example, when Rot is a 8×8 matrix, they may specifically be represented in the following table:

| i3 index | Rot matrix |
|---|---|
| 0 | diag ([1 1 1 1 1 1 1 1]) |
| 1 | diag ($[1\ e^{j\frac{\pi}{8}}\ e^{j\frac{2\pi}{8}}\ e^{j\frac{3\pi}{8}}\ e^{j\frac{4\pi}{8}}\ e^{j\frac{5\rho}{8}}\ e^{j\frac{6\pi}{8}}\ e^{j\frac{7\pi}{8}}]$) |
| 2 | diag ($[1\ e^{j\frac{-\pi}{8}}\ e^{j\frac{-2\pi}{8}}\ e^{j\frac{-3\pi}{8}}\ e^{j\frac{-4\pi}{8}}\ e^{j\frac{-5\rho}{8}}\ e^{j\frac{-6\pi}{8}}\ e^{j\frac{-7\pi}{8}}]$) |
| 3 | Reserved |

The terminal selects Index=0 according to a CQI maximum principle after traversing, and then i3=0. The terminal reports $(i_1, i_2, i_3)$ as: (0,1,0). The base station selectively receives PMI information from the terminal, and the base station obtains a final code word according to acquired precoding code word information, and precodes sent information.

Example 15

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ represents the total number of ports or the total number of antennas, and is an integer more than or equal to 8.

When $N_t=32$ and RI=2, $v_0$, $v_1$, $v_2$ and $v_3$ are all vectors of 8×1; and $\beta$ is a fixed value, and for example, $\beta=-1$.

Its candidate vector set is: $W=W_1 \cdot W_2$. For example, $v_0$, $v_1$, $v_2$ and $v_3$ are R11 8Tx Rank1 code words,
where $W_1$ consists of $$X^{(k)}: W_1^{(k)} = \begin{bmatrix} X^{(k)} & 0 \\ 0 & X^{(k)} \end{bmatrix},$$

in the formula: $X^{(k)} \in \{[b_{2k\ mod32}\ b_{(2k+1)mod32}\ b_{(2k+2)mod32}\ b_{(2k+3)mod33}]; k=0, 1, \ldots, 15\}$, and in the formula, $$B = [b_0\ b_1\ \ldots\ b_{31}][B]_{1+m,1+n} = e^{j\frac{2\pi mn}{32}},$$

m=0, 1, 2, 3, n=0, 1, ..., 31; and $W_1=\{W_1^{(0)}, W_1^{(1)}, W_1^{(2)}, \ldots, W_1^{(15)}\}$, and $$W_2 \in C_2 \in \left\{\frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}\right\},$$

$Y \in \{\tilde{e}_1, \tilde{e}_2, \tilde{e}_3, \tilde{e}_4\}$, where:

$$e_1 = \begin{bmatrix} 1 \\ 0 \\ 0 \\ 0 \end{bmatrix}, e_2 = \begin{bmatrix} 0 \\ 1 \\ 0 \\ 0 \end{bmatrix}, e_3 = \begin{bmatrix} 0 \\ 0 \\ 1 \\ 0 \end{bmatrix} \text{ and } e_4 = \begin{bmatrix} 0 \\ 0 \\ 0 \\ 1 \end{bmatrix},$$

where a code word obtained by $W_1 \cdot W_2$ may be represented by the following table:

|  | $x_2$ | | | | | | | |
|---|---|---|---|---|---|---|---|---|
| $x_1$ | 0 | 1 | 2 | 3 | 4 | 5 | 6 | 7 |
| 0~15 | $W_{2x_1,0}^{(1)}$ | $W_{2x_1,1}^{(1)}$ | $W_{2x_1,2}^{(1)}$ | $W_{2x_1,3}^{(1)}$ | $W_{2x_1+1,0}^{(1)}$ | $W_{2x_1+1,1}^{(1)}$ | $W_{2x_1+1,2}^{(1)}$ | $W_{2x_1+1,3}^{(1)}$ |

|  | $x_2$ | | | | | | | |
|---|---|---|---|---|---|---|---|---|
| $x_1$ | 8 | 9 | 10 | 11 | 12 | 13 | 14 | 15 |
| 0~15 | $W_{2x_1+2,0}^{(1)}$ | $W_{2x_1+2,1}^{(1)}$ | $W_{2x_1+2,2}^{(1)}$ | $W_{2x_1+2,3}^{(1)}$ | $W_{2x_1+3,0}^{(1)}$ | $W_{2x_1+3,1}^{(1)}$ | $W_{2x_1+3,2}^{(1)}$ | $W_{2x_1+3,3}^{(1)}$ |

Where $W_{m,n}^1 = \frac{1}{\sqrt{8}} \begin{bmatrix} V_m \\ \phi_n V_m \end{bmatrix}$ Herein, vectors $v_0$ and $v_1$ have the same $W_1$ indicated by i1, and vectors $v_2$ and $v_3$ have the same $W_1$ indicated by i2. The terminal traverses each code word in $W_1$, selects and indicates $W_1$ by i1 for vectors $v_0$ and $v_1$, for example, i1=3, selects and indicates $W_1$ by i2 for vectors $v_2$ and $v_3$, for example, i2=0, selects and indicates $W_2$ by i3 for vectors $v_0$ and $v_1$ on the basis of selected $W_1$ index=3, $v_0=v_1$ at this moment, for example, i3=1, and selects and indicates $W_2$ by i4 for vectors $v_2$ and $v_3$ on the basis of selected $W_1$ index=0, $v_2=v_3$ at this moment, for example, i4=5. The terminal reports the selected $(i_1,i_2,i_3,i_4)$ as (3,0,1,5).

The base station selectively receives PMI information from the terminal, and may obtain $\alpha_1$ and $\alpha_2=j$ according to at least one vector in vectors $v_0$, $v_1$, $v_2$ and $v_3$ fed back by the terminal, and a specific operating manner is described in example 1 or 2.

The base station obtains a final code word according to acquired precoding code word information, and precodes sent information.

Example 16

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ represents the total number of ports or the total number of antennas, and is an integer more than or equal to 8.

When $N_t=32$ and RI=2, $v_0$, $v_1$, $v_2$ and $v_3$ are all vectors of 8×1. Its candidate vector set is described in example 15, phase $\beta$ is selected by the terminal, and its candidate set is shown in the following table:

| Index4 | 0 | 1 | 2 | 3 | 4 | 5 | 6 | 7 |
|---|---|---|---|---|---|---|---|---|
| Phase coefficient | 1 | $e^{j\frac{\pi}{4}}$ | j | $e^{j\frac{3\pi}{4}}$ | −1 | $e^{j\frac{5\pi}{4}}$ | −j | $e^{j\frac{7\pi}{4}}$ |

Herein, vectors $v_0$, $v_1$, $v_2$ and $v_3$ have the same $W_1$ indicated by i1. The terminal traverses each code word in $W_1$, selects and indicates $W_1$ by i1 for vectors $v_0$, $v_1$, $v_2$ and $v_3$, for example, i1=0, selects and indicates $W_2$ by i2 for vectors $v_0$ and $v_1$ on the basis of selected $W_1$ index=0, $v_0=v_1$ at this moment, for example, i2=1, selects and indicates $W_2$ by i3 for vectors $v_2$ and $v_3$ on the basis of selected $W_1$ index=0, $v_2=v_3$ at this moment, for example, i3=5, selects $\beta$ from the candidate set of $\beta$, indicates $\beta$ by index4, for example index4=1, and the terminal reports the selected $(i_1,i_2,i_3,i_4)$ as (0,1,5,1). The base station selectively receives PMI information from the terminal, and may obtain $\alpha_1$ and $\alpha_2=j$ according to at least one vector in vectors $v_0$, $v_1$, $v_2$ and $v_3$ fed back by the terminal, and a specific operating manner is described in example 1 or 2. The base station obtains a final code word according to acquired precoding code word information, and precodes sent information.

Example 17

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ represents the total number of ports or the total number of antennas, and is an integer more than or equal to 8.

When $N_t=16$ and RI=2, $v_0$, $v_1$, $v_2$ and $v_3$ are all vectors of 4×1. Its candidate vector set is described in example 13. The terminal selects a code word for reporting, where vectors $v_0$ and $v_1$ have a common candidate vector set $x_1$ indicated by i1. For example, the terminal calculates the most proper code word: $x_1=0$, according to a CQI, and at this moment, i1=0; and the terminal selects and indicates $x_1$ by i2 for $v_0$ and $v_1$ on the basis of selected $x_1=0$, $v_0=v_1$, and for example, if Index=1 is selected, i2=1.

The terminal multiplies $v_0$ and $v_1$ by matrix Rot to obtain $v_2$ and $v_3$, and indicates an option of matrix Rot by i3, and for example, when Rot is a 8×8 matrix:

$$\begin{bmatrix} v_2 \\ v_3 \end{bmatrix} = Rot \times \begin{bmatrix} v_0 \\ v_1 \end{bmatrix},$$

they may specifically be represented in the following table:

| i3 index | Rot matrix |
|---|---|
| 0 | diag ([1 1 1 1 1 1 1 1]) |
| 1 | diag ($\begin{bmatrix} 1 & e^{j\frac{\pi}{8}} & e^{j\frac{2\pi}{8}} & e^{j\frac{3\pi}{8}} & e^{j\frac{4\pi}{8}} & e^{j\frac{5\rho}{8}} & e^{j\frac{6\pi}{8}} & e^{j\frac{7\pi}{8}} \end{bmatrix}$) |
| 2 | diag ($\begin{bmatrix} 1 & e^{j\frac{-\pi}{8}} & e^{j\frac{-2\pi}{8}} & e^{j\frac{-3\pi}{8}} & e^{j\frac{-4\pi}{8}} & e^{j\frac{-5\rho}{8}} & e^{j\frac{-6\pi}{8}} & e^{j\frac{-7\pi}{8}} \end{bmatrix}$) |
| 3 | Reserved |

The terminal selects Index=0 according to a CQI maximum principle after traversing, and then i3=0.

Phase $\beta$ is selected by the terminal, and its candidate set is shown in the following table:

| Index4 | 0 | 1 | 2 | 3 | 4 | 5 | 6 | 7 |
|---|---|---|---|---|---|---|---|---|
| Phase coefficient | 1 | $e^{j\frac{\pi}{4}}$ | j | $e^{j\frac{3\pi}{4}}$ | −1 | $e^{j\frac{5\pi}{4}}$ | −j | $e^{j\frac{7\pi}{4}}$ |

$\beta$ is selected from the candidate set of $\beta$, and is indicated by index4, for example, index4=1, and the terminal reports the selected $(i_1,i_2,i_3,i_4)$ as (0,1,5,1). The base station selectively receives PMI information from the terminal, and may obtain $\alpha_1$ and $\alpha_2=j$ according to at least one vector in vectors $v_0$, $v_1$, $v_2$ and $v_3$ fed back by the terminal, and a specific operating manner is described in example 1 or 2. The base station obtains a final code word according to acquired precoding code word information, and precodes sent information.

Example 18

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of ($N_t/4$), and $N_t$ represents the total number of ports or the total number of antennas, and is an integer more than or equal to 8.

$\beta$ is determined by the base station, and the terminal and the base station store the same $\beta$ value, for example $\beta=-1$. When $N_t=32$ and RI=2, $v_0$, $v_1$, $v_2$ and $v_3$ are all vectors of 8×1, and a candidate vector set is: $W=W_1 \cdot W_2$, specifically as described in example 15.

Herein, vectors $v_0$, $v_1$, $v_2$ and $v_3$ have the same $W_1$ indicated by i1. The terminal traverses each code word in $W_1$, selects and indicates $W_1$ by i1 for vectors $v_0$, $v_1$, $v_2$ and $v_3$ according to a maximum signal to noise ratio principle, for example, i1=15, selects and indicates $W_2$ by i2 for vectors $v_0$ and $v_1$ on the basis of selected $W_1$ index=15, $v_0=v_1$ at this moment, for example, i2=10, and selects and indicates $W_2$ by i3 for $v_2$ and $v_3$ on the basis of selected $W_1$ index=15, $v_2=v_3$ at this moment, for example, i3=5. A candidate set of phase factors $\alpha_1$ and $\alpha_2$ is shown in the following table:

| Index4 | 0 | 1 | 2 | 3 | 4 | 5 | 6 | 7 |
|---|---|---|---|---|---|---|---|---|
| $\{\alpha_1, \alpha_2\}$ phase coefficient | $\{1, 1\}$ | $\{e^{j\frac{\pi}{4}}, e^{j\frac{\pi}{4}}\}$ | $\{1, j\}$ | $\{e^{j\frac{\pi}{4}}, e^{j\frac{3\pi}{4}}\}$ | $\{-1, -1\}$ | $\{e^{j\frac{5\pi}{4}}, j\}$ | $\{-j, -j\}$ | $\{j, e^{j\frac{7\pi}{4}}\}$ |

The terminal selects and indicates proper $\alpha_1$ and $\alpha_2$ values by i4, for example, i4=3.

The terminal reports the selected ($i_1, i_2, i_3, i_4$) as (15,10,5,3).

The base station selectively receives PMI information from the terminal, and the base station obtains a final code word according to acquired precoding code word information, and precodes sent information.

Example 19

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or 16 vectors of ($N_t/4$), and $N_t$ is the total number of ports or the total number of antennas, and is an integer more than or equal to 8.

When $N_t=32$ and RI=2, $v_0$, $v_1$, $v_2$ and $v_3$ are all vectors of 4×1.

It is supposed that candidate vectors of $v_0$, $v_1$, $v_2$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Herein i1 indicates a combination of a candidate vector set of $v_0$, $v_1$, $v_2$ and $v_3$, $\alpha_1$, $\alpha_2$ and $\beta$, specifically as shown in the following table:

| i1 Index | 0 | 1 | 2 | 3 |
|---|---|---|---|---|
| Index1 combination | $\{0, 1\}$ | $\{2, 3\}$ | $\{4, 5\}$ | $\{6, 7\}$ |
| $\alpha_1, \alpha_2, \beta$ | $\{1\ e^{j\frac{\pi}{8}}\ ...\ e^{j\frac{3\pi}{8}}\}$ | $\{j\ e^{j\frac{5\pi}{8}}\ ...\ e^{j\frac{7\pi}{8}}\}$ | $\{-1\ e^{j\frac{9\pi}{8}}\ ...\ e^{j\frac{11\pi}{8}}\}$ | $\{-j\ e^{j\frac{13\pi}{8}}\ ...\ e^{j\frac{15\pi}{8}}\}$ |

If an Index1 combination indicated by an i1 Index is $\{a,b\}$, a combination, indicated by i2, of $v_0$ and $v_1$ may be: $\{a,a\}$, $\{a,b\}$, $\{b,a\}$ and $\{b,b\}$, and a combination, indicated by i3, of $v_2$ and $v_3$ is the same as that indicated by i2; the terminal traverses code word combinations indicated by each i1 Index, and selects i1=2 according to a CQI maximum principle; the terminal selects and indicates $v_0$ and $v_1$ by i2 on the basis of selected i1, and for example, if $\{a,b\}$ is selected, i2=1; the terminal selects and indicates $v_2$ and $v_3$ by i3, and for example, if $\{b,a\}$ is selected, i3=2; and the terminal selects a phase indicated by the selected i1, and assigns values to $\alpha_1$, $\alpha_2$ and $\beta$, and for example, if phase options indicated by i1 are $\{x_1\ x_2\ x_3\ x_4\}$, options, indicated by i4, of phase factors $\alpha_1$, $\alpha_2$ and $\beta$ are shown in the following table:

| Index | 0 | 1 | 2 | 3 | 4 | 5 | 6 | 7 |
|---|---|---|---|---|---|---|---|---|
| $\alpha_1$ | $x_1$ | $x_1$ | $x_1$ | $x_1$ | $x_2$ | $x_2$ | $x_2$ | $x_2$ |
| $\alpha_2$ | $x_1$ | $x_2$ | $x_3$ | $x_4$ | $x_1$ | $x_2$ | $x_3$ | $x_4$ |
| $\beta$ | $x_3$ | $x_1$ | $x_3$ | $x_4$ | $x_2$ | $x_3$ | $x_2$ | $x_4$ |

| Index | 8 | 9 | 10 | 11 | 12 | 13 | 14 | 15 |
|---|---|---|---|---|---|---|---|---|
| $\alpha_1$ | $x_3$ | $x_3$ | $x_3$ | $x_3$ | $x_4$ | $x_4$ | $x_4$ | $x_4$ |
| $\alpha_2$ | $x_1$ | $x_2$ | $x_3$ | $x_4$ | $x_1$ | $x_2$ | $x_3$ | $x_4$ |
| $\beta$ | $x_3$ | $x_1$ | $x_3$ | $x_4$ | $x_2$ | $x_3$ | $x_2$ | $x_4$ |

For example, the terminal selects i4=5 on the basis of i1=2, and the terminal reports $(i_1,i_2,i_3,i_4)$ as: (2,1,2,5). The base station selectively receives PMI information from the terminal, and may determine phase factors $\alpha_1$, $\alpha_2=j$ and $\beta$, $v_0$, $v_1$, $v_2$ and $v_3$ in a code word model according to the PMI information. The base station may obtain a code word to be reported by the terminal by combining the information.

Example 20

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or 16 vectors of $(N_t/4)$, and $N_t$ is the total number of ports or the total number of antennas, and is an integer more than or equal to 8.

When $N_t=16$ and RI=2, $v_0$, $v_1$, $v_2$ and $v_3$ are all vectors of 4×1. It is supposed that candidate vectors of $v_0$, $v_1$, $v_2$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Herein i1 indicates a combination of a candidate vector set of $v_0$, $v_1$, $v_2$ and $v_3$, $\alpha_1$, $\alpha_2$ and $\beta$, specifically as shown in the following table:

| i1 Index | 0 | 1 | 2 | 3 |
|---|---|---|---|---|
| Index1 combination | {0, 1} | {2, 3} | {4, 5} | {6, 7} |
| $\alpha_1$, $\alpha_2$, $\beta$ | $\{1\ e^{j\frac{\pi}{8}}\ \ldots\ e^{j\frac{3\pi}{8}}\}$ | $\{j\ e^{j\frac{5\pi}{8}}\ \ldots\ e^{j\frac{7\pi}{8}}\}$ | $\{-1\ e^{j\frac{9\pi}{8}}\ \ldots\ e^{j\frac{11\pi}{8}}\}$ | $\{-j\ e^{j\frac{13\pi}{8}}\ \ldots\ e^{j\frac{15\pi}{8}}\}$ |

If an Index1 vector combination indicated by an i1 Index is {a,b} and a phase combination is $\{x_1\ x_2\ x_3\ x_4\}$, a combination, indicated by i2, of $v_0$, $v_1$ and $\alpha_1$ may be shown in the following table:

| | Index2 | | | |
|---|---|---|---|---|
| | 0 | 1 | 2 | 3 |
| $v_0, v_1/\alpha_1$ | $\{a, a\}/x_1$ | $\{a, b\}/x_3$ | $\{b, a\}/x_1$ | $\{b, b\}/x_3$ |

| | Index2 | | | |
|---|---|---|---|---|
| | 4 | 5 | 6 | 7 |
| $v_0, v_1/\alpha_1$ | $\{a, a\}/x_1$ | $\{a, b\}/x_3$ | $\{b, a\}/x_1$ | $\{b, b\}/x_3$ | and a combination, indicated by i3, of $v_2$, $v_3$ and $\alpha_2=j$ is the same as that indicated by i2; the terminal traverses code word combinations indicated by each i1 Index, and selects i1=2 according to a CQI maximum principle; the terminal selects and indicates $v_0$, $v_1$ and $\alpha_1$ by i2 on the basis of selected i1, and for example, if i2=1 is selected; the terminal selects and indicates $v_2$, $v_3$ and $\alpha_2$ by i3, and for example, if i3=2 is selected; and the terminal selects a phase indicated by the selected i1, and assigns a value to $\beta$, and for example, if phase options indicated by i1 are $\{x_1\ x_2\ x_3\ x_4\}$, an option, indicated by i4, of phase factor $\beta$ may be shown in the following table:

| | Index | | | |
|---|---|---|---|---|
| | 0 | 1 | 2 | 3 |
| $\beta$ | $x_3$ | $x_1$ | $x_3$ | $x_4$ |

For example, the terminal selects i4=5 on the basis of i1=2, and the terminal reports $(i_1,i_2,i_3,i_4)$ as: (2,1,2,5). The base station selectively receives PMI information from the terminal, and may determine phase factors $\alpha_1$, $\alpha_2$ and $\beta$, $v_0$, $v_1$, $v_2$ and $v_3$ in a code word model according to the PMI information. The base station may obtain a code word to be reported by the terminal by combining the information.

Example 21

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ is the total number of ports or the total number of antennas, and is an integer more than or equal to 8.

When $N_t=16$ and RI=2, $v_0$, $v_1$, $v_2$ and $v_3$ are all vectors of 4×1.

It is supposed that candidate vectors of $v_0$, $v_1$, $v_2$ and $v_3$ are shown in the following table:

| Index1 | Candidate vector | Index1 | Candidate vector |
|---|---|---|---|
| 0 | $[1\ 1\ 1\ 1]^T$ | 1 | $[1\ (1+j)/\sqrt{2}\ j\ (-1+j)/\sqrt{2}]^T$ |
| 2 | $[1\ j\ -1\ -j]^T$ | 3 | $[1\ (-1+j)/\sqrt{2}\ -j\ (1+j)/\sqrt{2}]^T$ |
| 4 | $[1\ -1\ 1\ -1]^T$ | 6 | $[1\ (-1-j)/\sqrt{2}\ j\ (1-j)/\sqrt{2}]^T$ |
| 6 | $[1\ -j\ -1\ j]^T$ | 7 | $[1\ (1-j)/\sqrt{2}\ -j\ (-1-j)/\sqrt{2}]^T$ |

Herein i1 indicates a combination of a candidate vector set of $v_0$, $v_1$, $v_2$ and $v_3$, $\alpha_1$, $\alpha_2$ and $\beta$, specifically as shown in the following table:

| i1 Index | 0 | 1 | 2 | 3 |
|---|---|---|---|---|
| Index1 combination | {0, 1, 2, 3} | {0, 1, 2, 3} | {4, 5, 6, 7} | {4, 5, 6, 7} |
| $\alpha_1, \alpha_2, \beta$ | $\{1\ e^{j\frac{\pi}{8}}\ \ldots\ e^{j\frac{3\pi}{8}}\}$ | $\{j\ e^{j\frac{5\pi}{8}}\ \ldots\ e^{j\frac{7\pi}{8}}\}$ | $\{-1\ e^{j\frac{9\pi}{8}}\ \ldots\ e^{j\frac{11\pi}{8}}\}$ | $\{-j\ e^{j\frac{13\pi}{8}}\ \ldots\ e^{j\frac{15\pi}{8}}\}$ |

If an Index1 vector combination indicated by an i1 index is $\{a,b,c,d\}$, $v_0=v_1=v_2=v_3$, a combination, indicated by i2, of $v_0$, $v_1$, $v_2$ and $v_3$ may be shown in the following table:

| | Index2 | | | |
|---|---|---|---|---|
| | 0 | 1 | 2 | 3 |
| $v_0, v_1, v_2, v_3$ | a | b | c | d |

Information about phase factor $\beta$ indicated by i3, if a phase combination indicated by an i1 Index is $\{x_1\ x_2\ x_3\ x_4\}$ may be shown in the following table:

| | Index3 | | | |
|---|---|---|---|---|
| | 0 | 1 | 2 | 3 |
| $\beta$ | $x_1$ | $x_2$ | $x_3$ | $x_4$ |

An information combination, indicated by i4, of phase factors $\alpha_1$ and $\alpha_2$ may specifically be shown in the following table:

| | Index4 | | | |
|---|---|---|---|---|
| | 0 | 1 | 2 | 3 |
| $\alpha_1, \alpha_2$ | $x_1\ x_1$ | $x_1\ x_2$ | $x_2\ x_3$ | $x_3\ x_4$ |

The terminal traverses code word combinations indicated by each i1 Index, and selects i1=2 according to a CQI maximum principle; the terminal selects and indicates $v_0$, $v_1$, $v_2$ and $v_3$ by i2 on the basis of the selected i1, and for example, i2=0 is selected; the terminal selects and indicates phase factor $\beta$ by i3, and for example, i3=2 is selected; the terminal selects phase factors $\alpha_1$ and $\alpha_2$, and for example, the terminal selects i4=5 on the basis of i1=2; and the terminal reports $(i_1,i_2,i_3,i_4)$ as: (2,0,2,5).

The base station selectively receives PMI information from the terminal, and may determine phase factors $\alpha_1$, $\alpha_2$ and $\beta$, $v_0$, $v_1$, $v_2$ and $v_3$ in a code word model according to the PMI information. The base station may obtain a code word to be reported by the terminal by combining the information.

Example 22

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ is the total number of ports or the total number of antennas, and is an integer more than or equal to 8.

When $N_t$=32 and RI=2, $v_0$, $v_1$, $v_2$ and $v_3$ are all vectors of 8×1, and are indicated by i1, i2, i3 and i4 respectively, and its candidate vector set may include the following vectors:

| Index1 | Candidate vector |
|---|---|
| 0 | $[1\ 1\ 1\ 1\ 1\ 1\ 1\ 1]^T$ |
| 1 | $[1\ j\ -1\ -j\ 1\ j\ 1\ j]^T$ |
| 2 | $[1\ -1\ 1\ -1\ 1\ -1\ 1\ -1]^T$ |
| 3 | $[1\ -j\ -1\ j\ 1\ -j\ -1\ j]^T$ |
| 4 | $[1\ 1\ -1\ -1\ 1\ 1\ -1\ -1]^T$ |
| 5 | $[1\ j\ 1\ j\ 1\ j\ 1\ j]^T$ |
| 6 | $[1\ -1\ -1\ 1\ 1\ -1\ -1\ 1]^T$ |
| 7 | $[1\ -j\ 1\ -j\ 1\ -j\ 1\ -j]^T$ |

In the formula, $\beta$ is determined by the base station, and defaults to be a fixed value, for example, 1; and $\alpha_1$ and $\alpha_2$ are indicated by i5 and i6, and a candidate set of $\alpha_1$ and $\alpha_2$ is shown in the following table:

| Index | 0 | 1 | 2 | 3 | 4 | 5 | 6 | 7 |
|---|---|---|---|---|---|---|---|---|
| Phase coefficient | 1 | $e^{j\frac{\pi}{4}}$ | $j$ | $e^{j\frac{3\pi}{4}}$ | $-1$ | $e^{j\frac{5\pi}{4}}$ | $-j$ | $e^{j\frac{7\pi}{4}}$ |

After the terminal traverses each code word and phase, vector indices selected for $v_0$, $v_1$, $v_2$ and $v_3$ are 0, 1, 2 and 8 respectively, phase indices selected for $\alpha_1$ and $\alpha_2$ are 0 and 2, and the terminal reports $(i_1,i_2,i_3,i_4,i_5,i_6)$ as: (0,1,2,8,0,2).

The base station selectively receives PMI information from the terminal, and may determine phase factors $\alpha_1$, $\alpha_2$ and $\beta$, $v_0$, $v_1$, $v_2$ and $v_3$ in a code word model according to the PMI information. The base station may obtain a code word to be reported by the terminal by combining the information.

Example 23

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of ($N_t/4$), and $N_t$ is the total number of ports or the total number of antennas, and is an integer more than or equal to 8.

When $N_t=32$ and RI=2, $v_0$, $v_1$, $v_2$ and $v_3$ are all vectors of 8×1, and are indicated by i1, i2, i3 and i4 respectively, and its candidate vector set may include the following vectors:

| Index1 | Candidate vector |
|---|---|
| 0 | $[1\ 1\ 1\ 1\ 1\ 1\ 1\ 1]^T$ |
| 1 | $[1\ j\ -1\ -j\ 1\ j\ 1\ j]^T$ |
| 2 | $[1\ -1\ 1\ -1\ 1\ -1\ 1\ -1]^T$ |
| 3 | $[1\ -j\ -1\ j\ 1\ -j\ -1\ j]^T$ |
| 4 | $[1\ 1\ -1\ -1\ 1\ 1\ -1\ -1]^T$ |
| 5 | $[1\ j\ 1\ j\ 1\ j\ 1\ j]^T$ |
| 6 | $[1\ -1\ -1\ 1\ 1\ -1\ -1\ -1]^T$ |
| 7 | $[1\ -j\ 1\ -j\ 1\ -j\ 1\ -j]^T$ |

In the formula, $\alpha_1$ and $\alpha_2$ are indicated by i5 and i6 respectively, $\beta$ is indicated by i7, and a candidate set of $\alpha_1$, $\alpha_2$ and $\beta$ is shown in the following table:

| Index | 0 | 1 | 2 | 3 | 4 | 5 | 6 | 7 |
|---|---|---|---|---|---|---|---|---|
| Phase coefficient | 1 | $e^{j\frac{\pi}{4}}$ | j | $e^{j\frac{3\pi}{4}}$ | −1 | $e^{j\frac{5\pi}{4}}$ | −j | $e^{j\frac{7\pi}{4}}$ |

After the terminal traverses each code word and phase, vector indices selected for $v_0$, $v_1$, $v_2$ and $v_3$ are 0, 1, 2 and 8 respectively, phase indices selected for $\alpha_1$ and $\alpha_2$ are 0 and 2, the selected phase $\beta$ is 0, and the terminal reports ($i_1,i_2,i_3,i_4,i_5,i_6,i_7$) as (0,1,2,8,0,2,0).

The base station selectively receives PMI information from the terminal, and may determine phase factors $\alpha_1$, $\alpha_2$ and $\beta$, $v_0$, $v_1$, $v_2$ and $v_3$ in a code word model according to the PMI information. The base station may obtain a code word to be reported by the terminal by combining the information.

Example 24

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of ($N_t/4$), and $N_t$ is the total number of ports or the total number of antennas, and is an integer more than or equal to 8.

When $N_t=16$ and RI=2, $v_0$, $v_1$, $v_2$ and $v_3$ are all vectors of 4×1.

A candidate vector set is shown in example 13. The terminal selects a code word for reporting, where vectors $v_0$, $v_1$, $v_2$ and $v_3$ have a common candidate vector set $W_1$ indicated by i1. For example, the terminal calculates the most proper code word: $x_1=0$, according to a CQI, and at this moment, i1=0; the terminal selects and indicates $x_2$ by i2 for $v_0$ on the basis of selected $W_1(n=0)$, and selects and indicates $v_1$ by i3, the terminal selects and indicates $x_2$ by i4 for $v_2$, and the terminal selects and indicates $x_2$ by i5 for $v_3$. For example, the terminal reports ($i_1,i_2,i_3,i_4,i_5$) as: (0,1,0,1,1).

The base station selectively receives PMI information from the terminal, and determines phase factors $\alpha_1$, $\alpha_2$ and $\beta$ in a code word model, where $\beta$ is a fixed value, and for example, $\beta=j$. $\alpha_1$ and $\alpha_2$ may be obtained according to vectors $v_0$, $v_1$, $v_2$ and $v_3$ fed back by the terminal, for example:

the base station obtains information $\alpha_1$ according to vector $v_0$, and the base station obtains information $\alpha_2$ according to vector $v_2$; the base station determines $v_0$ according to i1 and i2 fed back by the terminal, the obtained $v_0$ is vector: $\frac{1}{2} \cdot [1\ 1\ j\ j]^T$, and at this moment, $\alpha_1=j$ may be obtained according to a product of a second element and seventh element of $v_0$; and the base station determines $v_2$ to obtain vector $\frac{1}{2} \cdot [1\ 1\ 1\ 1]^T$ according to i1 and i3 fed back by the terminal, and similarly, $\alpha_2=1$ may be obtained according to $v_2$.

The base station obtains a final code word according to acquired precoding code word information, and precodes sent information.

Example 25

A base station or a terminal stores $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of ($N_t/4$), and $N_t$ is the total number of ports or the total number of antennas, and is an integer more than or equal to 8.

When $N_t=16$ and RI=2, $v_0$, $v_1$, $v_2$ and $v_3$ are all vectors of 4×1.

Its candidate vector set may be obtained by the following formula:

$$C = W_1 \cdot W_2 W = W_3 \cdot C,$$

$$W_1 = \begin{bmatrix} X_n & 0 \\ 0 & X_n \end{bmatrix},$$

where n=0, 1, ..., 15, $$X_n = \begin{bmatrix} 1 & 1 & 1 & 1 \\ q_1^n & q_1^{n+8} & q_1^{n+16} & q_1^{n+24} \end{bmatrix},$$

where $q_1 = e^{j2\pi/32}$, $$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\},$$

$Y \in \{e_1, e_2, e_3, e_4\}$ and $\alpha(i) = q_1^{2(i-1)}$, where:

$$e_1 = \begin{bmatrix} 1 \\ 0 \\ 0 \\ 0 \end{bmatrix}, e_2 = \begin{bmatrix} 0 \\ 1 \\ 0 \\ 0 \end{bmatrix}, e_3 = \begin{bmatrix} 0 \\ 0 \\ 1 \\ 0 \end{bmatrix}, e_4 = \begin{bmatrix} 0 \\ 0 \\ 0 \\ 1 \end{bmatrix},$$

and $W_3$ may be represented in the following table:

| i3 index | Rot matrix |
|---|---|
| 0 | diag ([1 1 ... 1]) |
| 1 | diag $\left(\left[ 1 \quad e^{j\frac{\pi}{8}} \quad \ldots \quad e^{j\frac{3\pi}{8}} \right]\right)$ |
| 2 | diag $\left(\left[ 1 \quad e^{j\frac{-\pi}{8}} \quad \ldots \quad e^{j\frac{-3\pi}{8}} \right]\right)$ |
| 3 | Reserved |

Herein the Rot matrix is a $N_t/4 \times N_t/4$ matrix.

The terminal selects a code word for reporting, where vectors $v_0$, $v_1$, $v_2$ and $v_3$ have a common candidate vector set $W_1$ indicated by i1. For example, the terminal calculates the most proper code word: $W_1(n=0)$, according to a CQI, and at this moment, i1=0; the terminal selects and indicates $W_2$ by i2 for $v_0$ and $v_1$ on the basis of selected $W_1(n=0)$, $v_0=v_1$, and for example, if Index=1 is selected, i2=1; the terminal selects and indicates $W_2$ by i3 for $v_2$ and $v_3$, $v_2=v_3$, and for example, if Index=0 is selected, i3=0; the terminal selects and indicates $W_3$ by i4 for $v_0$ and $v_1$ on the basis of i1 and i2, and for example, i4=0 is selected; and the terminal selects and indicates $W_3$ by i5 for $v_2$ and $v_3$ on the basis of i1 and i3, and for example, i5=1 is selected. The terminal reports $(i_1, i_2, i_3, i_4, i_5)$ as: (0,2,0,0,1).

The base station selectively receives PMI information from the terminal, obtains a final code word according to acquired precoding code word information, and precodes sent information.

Example 26

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of ($N_t/4$), and $N_t$ is the total number of ports or the total number of antennas, and is an integer more than or equal to 8.

When $N_t=16$ and W is a rank2 code word, $v_0$, $v_1$, $v_2$ and $v_3$ are all vectors of 8×1, and its candidate vector set may include the following vectors:

| Index1 | Candidate vector |
|---|---|
| 0 | $[1\ 1\ 1\ 1]^T$ |
| 1 | $[1\ j\ -1\ -j]^T$ |
| 2 | $[1\ -1\ 1\ -1]^T$ |
| 3 | $[1\ -j\ -1\ j]^T$ |
| 4 | $[1\ (1+j)/\sqrt{2}\ j\ (-1+j)/\sqrt{2}]^T$ |
| 5 | $[1\ (-1+j)/\sqrt{2}\ -j\ (1+j)/\sqrt{2}]^T$ |
| 6 | $[1\ (-1-j)/\sqrt{2}\ j\ (1-j)/\sqrt{2}]^T$ |
| 7 | $[1\ (1-j)/\sqrt{2}\ -j\ (-1-j)/\sqrt{2}]^T$ |

In the formula, $\beta$ is determined by the base station, and defaults to be a fixed value, for example, j, a value of $\alpha_1$ is obtained according to $v_0$ and a value of $\alpha_2$ is calculated according to $v_2$. For example, after the terminal traverses each code word and phase, vector indices selected for $v_0$, $v_1$, $v_2$ and $v_3$ are 0, 4, 1 and 5 respectively, and the terminal reports values (0,1,4,5) of $(i_1, i_2, i_3, i_4)$. The base station receives the indices reported by the terminal, and calculates $\alpha_1$ and $\alpha_2$, $\alpha_1=1$ is calculated according to phase 0 of $v_0$, and $\alpha_2 = e^{j\pi/2} \cdot 5$ is obtained according to $\pi/2$ of $v_2$. The base station obtains a precoding code word according to the codebook indices and the phase values and the phase value determined by the base station as a default. The base station precodes sent information according to the precoding code word.

Example 27

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of ($N_t/4$), and $N_t$ is the total number of ports or the total number of antennas, and is an integer more than or equal to 8.

When $N_t=16$ and RI=2, $v_0$, $v_1$, $v_2$ and $v_3$ are all vectors of 4×1, and its candidate vector set is described in example 13.

| Index | 0 | 1 | 2 | 3 | 4 | 5 | 6 | 7 |
|---|---|---|---|---|---|---|---|---|
| Phase coefficient | 1 | $e^{j\frac{\pi}{4}}$ | j | $e^{j\frac{3\pi}{4}}$ | −1 | $e^{j\frac{5\pi}{4}}$ | −j | $e^{j\frac{7\pi}{4}}$ |

The terminal selects a code word for reporting, where vectors $v_0$, $v_1$, $v_2$ and $v_3$ have common $W_1$ indicated by i1. For example, the terminal calculates the most proper code word: $W_1(n=0)$, according to a CQI, and at this moment, i1=0; the terminal selects $W_2$ for $v_0$ and $v_1$ on the basis of selected $W_1(n=0)$, $v_0=v_1$, and for example, if Index=1 is selected, i2=1; the terminal selects $W_2$ for $v_2$ and $v_3$, $v_2=v_3$, and for example, if Index=0 is selected, i3=0; the terminal traverses and selects $\beta$, and if Index=2 is selected, i4=2. The terminal reports $(i_1, i_2, i_3, i_4)$ as: (0,1,0,2). The base station selectively receives a code word sent by the terminal, and calculates phase factors $\alpha_1$ and $\alpha_2$, and a calculation manner for $\alpha_1$ and $\alpha_2$ refers to the abovementioned examples. The base station precodes sent information according to the acquired precoding code word.

Example 28

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ is the total number of ports or the total number of antennas, and is an integer more than or equal to 8.

When $N_t=32$ and W is a rank2 code word, $v_0$, $v_1$, $v_2$ and $v_3$ are all vectors of 8×1.

Its candidate vector set is: $W=W_1 \cdot W_2$, and an example vector set is described in example 15.

$\beta$ is determined by the base station, and for example, the base station specifies that $\beta=1$.

The terminal selects a code word for reporting, where vectors $v_0$ and $v_1$ have common $W_1$ indicated by i1, and vectors $v_2$ and $v_3$ have common $W_1$ indicated by i3. For example, the terminal calculates the most proper code word: $W_1(n=0)$, for vectors $v_0$ and $v_1$ according to a CQI, and at this moment, i1=0; and meanwhile, $W_1$ is selected for $v_2$ and $v_3$, and i3=1. The terminal selects $W_2$ for $v_0$ on the basis of selected $W_1$–i1=0, $v_0=v_1$, and for example, if Index=1 is selected, i2=1. The terminal selects $W_2$ for $v_2$ and $v_3$ on the basis of selected $W_1$–i1=1, $v_2=v_3$, and for example, if Index=0 is selected, i4=0.

The terminal reports $(i_1,i_2,i_3,i_4)$ as: (0,1,1,0). The base station selectively receives a code word sent by the terminal, and calculates phase factors $\alpha_1$ and $\alpha_2$, and a calculation manner for $\alpha_1$ and $\alpha_2$ refers to the abovementioned examples. The base station precodes sent information according to the acquired precoding code word.

Example 29

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ is the total number of ports or the total number of antennas, and is an integer more than or equal to 8.

When $N_t=32$ and W is a rank2 code word, $v_0$, $v_1$, $v_2$ and $v_3$ are all vectors of 8×1.

Its candidate vector set is: $W=W_1 \cdot W_2$. For example, $v_0$, $v_1$, $v_2$ and $v_3$ are described in example 15, $\beta$ is a fixed value, and for example, $\beta=-1$.

The terminal selects a code word for reporting, where vectors $v_0$, $v_1$, $v_2$ and $v_3$ have common $W_1$ indicated by i1, vectors $v_0$ and $v_1$ have common $W_1$ indicated by i2, $v_0=v_1$, and vectors $v_2$ and $v_3$ have common $W_1$ indicated by i3, $v_2=v_3$. For example, the terminal calculates the most proper code word: $W_1(n=0)$, for vectors $v_0$, $v_1$, $v_2$ and $v_3$ according to received power sum maximum principle, and at this moment, i1=0; the terminal selects $W_2$ for $v_0$ and $v_1$ on the basis of determined $W_1$, and for example, if Index=1 is selected, i2=1; and the terminal selects $W_2$ for $v_2$ and $v_3$, and for example, if Index=0 is selected, i3=0.

The terminal reports $(i_1,i_2,i_3)$ as: (0,1,0) on a Physical Uplink Control Channel (PUCCH) or a Physical Uplink Shared Channel (PUSCH). The base station selectively receives a code word sent by the terminal, and calculates phase factors $\alpha_1$ and $\alpha_2$, and a calculation manner for $\alpha_1$ and $\alpha_2$ refers to the abovementioned examples. The base station precodes sent information according to the acquired precoding code word.

Example 30

A base station or a terminal stores a precoding codebook matrix model $$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix},$$

where $v_0$, $v_1$, $v_2$ and $v_3$ are all matrixes or vectors of $(N_t/4)$, and $N_t$ is the total number of ports or the total number of antennas, and is an integer more than or equal to 8. When $N_t=32$ and W is a rank2 code word, $v_0$, $v_1$, $v_2$ and $v_3$ are all vectors of 8×1.

Its candidate vector set is: $W=W_1 \cdot W_2$. For example, $v_0$, $v_1$, $v_2$ and $v_3$ are R11 8Tx Rank1 code words, and $\beta$ is a fixed value. The terminal selects a code word for reporting, where vectors $v_0$, $v_1$, $v_2$ and $v_3$ have common $W_1$ indicated by i1; vectors $v_0$ and $v_2$ have common $W_1$ indicated by i2, $v_0=v_2$; and vectors $v_1$ and $v_3$ have common $W_1$ indicated by i3, $v_1=v_3$. For example, the terminal calculates the most proper code word: $W_1(n=4)$, for vectors $v_0$, $v_1$, $v_2$ and $v_3$ according to received power sum maximum principle, and at this moment, i1=4; the terminal selects $W_2$ for $v_0$ and $v_2$ on the basis of determined $W_1$, and for example, if $W_2$ Index=1 is selected, i2=1; and the terminal selects $W_2$ for $v_1$ and $v_3$, and for example, if Index=0 is selected, i3=0.

The terminal reports $(i_1,i_2,i_3)$ as: (4,1,0) on a PUCCH or a PUSCH. The base station selectively receives a code word sent by the terminal, and calculates phase factors $\alpha_1$ and $\alpha_2$, and a calculation manner for $\alpha_1$ and $\alpha_2$ refers to the abovementioned examples. The base station precodes sent information according to the acquired precoding code word.

The embodiments of the disclosure further provides a computer storage medium, having computer-executable instructions stored therein, the computer-executable instruction being configured to execute at least one of the methods according to the embodiments of the disclosure, specifically the methods shown in FIG. 1, FIG. 2 or FIG. 3.

The computer storage medium includes: various media capable of storing program codes such as a mobile storage device, a ROM, a RAM, a magnetic disk or a compact disc, and is a non-transitory storage medium in an example embodiment.

The above is only the example embodiments of the disclosure and not intended to limit the scope of protection of the disclosure. All modifications made according to the principle of the disclosure shall fall within the scope of protection of the disclosure.

The invention claimed is:

1. A method for determining channel state feedback information, comprising:

measuring, by a terminal, a channel state to form a measurement result;

when a Rank Indicator (RI) is 2, forming, by the terminal, a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors;

forming, by the terminal, channel state feedback information according to the precoding matrix; and sending, by the terminal, the channel state feedback information to a base station.

2. The method according to claim 1, wherein forming the channel state feedback information according to the precoding matrix comprises:

forming channel state feedback information comprising a codebook index according to the precoding matrix and a mapping relationship between precoding matrices and codebook indices.

3. The method according to claim 2, wherein the codebook indices comprise: a first index i1, a second index i2 and a third index i3.

4. The method according to claim 3, wherein the codebook indices further comprise: a fourth index i4 and/or a fifth index i5.

5. The method according to claim 4, wherein the vectors $v_0$, $v_1$ and $v_3$ have a common candidate vector set A2; and i1 is configured to at least indicate the set A2.

6. The method according to claim 5, wherein i2 is further configured to at least indicate specific vectors of $v_0$ and $v_1$ or specific vectors of $v_0$, $v_1$, $v_2$ and $v_3$ in the vector set A2.

7. The method according to claim 5, wherein i3 is further configured to at least indicate specific vectors of $v_2$ and $v_3$ in the vector set A2.

8. The method according to claim 5, wherein i2 is further configured to at least indicate a candidate vector set B1 of $v_0$ and $v_1$ in the candidate vector set A2;

i3 is further configured to at least indicate a candidate vector set B2 of $v_2$ and $v_3$ in the candidate vector set A2, i4 is further configured to at least indicate specific vectors of $v_0$ and $v_1$ in the vector set B1; and i5 is further configured to at least indicate specific vectors of $v_2$ and $v_3$ in the vector set B2.

9. The method according to claim 5, wherein i2 is further configured to at least indicate the specific vector of $v_0$ in the vector set A2;

i3 is further configured to at least indicate the specific vector of $v_1$ in the vector set A2;

i4 is further configured to at least indicate the specific vector of $v_2$ in the vector set A2; and i5 is further configured to at least indicate the specific vector of $v_3$ in the vector set A2.

10. The method according to claim 5, wherein the vector $v_0 = v_1$, or $v_2 = v_3$ or $v_0 = v_1 = v_2 = v_3$.

11. The method according to claim 3, wherein the vectors $v_0$ and $v_1$ have a common candidate vector set A1;

i1 is configured to at least indicate the set A1; and i2 is configured to at least indicate specific vectors of $v_0$ and $v_1$ in the vector set A1.

12. The method according to claim 11, wherein i1 is further configured to at least indicate at least part of information of at least one of $\alpha_1$, $\alpha_2$ and $\beta$.

13. The method according to claim 3, wherein the vectors $v_2$ and $v_3$ have a common candidate vector set A3; and i2 or i3 is configured to at least indicate the candidate vector set A3.

14. The method according to claim 13, wherein i4 is configured to at least indicate specific vectors of $v_2$ and $v_3$ in the vector set A3.

15. The method according to claim 13, wherein i2 or i3 is further configured to at least indicate at least part of information of at least one of $\alpha_1$, $\alpha_2$ and $\beta$.

16. The method according to claim 3, wherein the vector $v_2 = R_{OT1} \times v_0$, and i3 is further configured to at least indicate matrix $R_{OT1}$; or, the vector $v_3 = R_{OT2} \times v_1$, and i3 is further configured to at least indicate matrix $R_{OT2}$; or, the vector $$\begin{bmatrix} v_2 \\ v_3 \end{bmatrix} = R_{OT3} \times \begin{bmatrix} v_0 \\ v_1 \end{bmatrix},$$

and i3 is further configured to at least indicate matrix $R_{OT3}$, where both $R_{OT1}$ and $R_{OT2}$ are $$\frac{N_t}{4} \times \frac{N_t}{4}$$

dimensional matrices; and $R_{OT3}$ is a $$\frac{N_t}{2} \times \frac{N_t}{2}$$

dimensional matrix.

17. The method according to claim 3, wherein i1 is a broadband feedback.

18. The method according to claim 1, wherein $\alpha_1$ or $\alpha_2$ is obtained according to at least one of the vectors $v_0$, $v_1$, $v_2$ and $v_3$.

19. A terminal, comprising:

a measurement unit, configured to measure a channel state to form a measurement result;

a first determination unit, configured to, when a Rank Indicator (RI) is 2, form a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors;

a forming unit, configured to form channel state feedback information according to the precoding matrix; and a sending unit configured to send the channel state feedback information to a base station.

20. A non-transitory computer storage medium having computer-executable instructions stored therein, the computer-executable instructions being configured to execute a method for determining channel state feedback information, wherein the method comprises:

measuring, by a terminal, a channel state to form a measurement result;

when a Rank Indicator (RI) is 2, forming, by the terminal, a precoding matrix according to the measurement result and the following precoding codebook matrix model W:

$$W = \begin{bmatrix} v_0 & v_2 \\ \alpha_1 v_1 & \alpha_2 v_3 \\ \beta \cdot v_0 & -\beta \cdot v_2 \\ \beta \cdot \alpha_1 v_1 & -\beta \cdot \alpha_2 v_3 \end{bmatrix}$$

where $v_0$, $v_2$, $v_1$ and $v_3$ are all vectors of $$\left(\frac{N_t}{4}, 1\right),$$

$N_t$ is the total number of communication ports or the total number of antennas, and is not smaller than 8, and $\alpha_1$, $\alpha_2$ and $\beta$ are all phase factors;

forming, by the terminal, channel state feedback information according to the precoding matrix; and sending, by the terminal, the channel state feedback information to a base station.

\* \* \* \* \*